US012570342B2

(12) United States Patent
Newell

(10) Patent No.: US 12,570,342 B2
(45) Date of Patent: Mar. 10, 2026

(54) NESTED LIFT-AND-STEER SUPPORT WHEELS

(71) Applicant: Gregory James Newell, Cascais (PT)

(72) Inventor: Gregory James Newell, Cascais (PT)

( * ) Notice: Subject to any disclaimer, the term of this patent is extended or adjusted under 35 U.S.C. 154(b) by 0 days.

(21) Appl. No.: 18/815,018

(22) Filed: Aug. 26, 2024

(65) Prior Publication Data

US 2024/0416986 A1 Dec. 19, 2024

Related U.S. Application Data

(63) Continuation of application No. 18/670,333, filed on May 21, 2024, now abandoned.

(60) Provisional application No. 63/467,982, filed on May 21, 2023.

(51) Int. Cl.
B62B 3/06 (2006.01)

(52) U.S. Cl.
CPC .......... B62B 3/0625 (2013.01); B62B 3/0612 (2013.01); B62B 2301/04 (2013.01); B62B 2301/254 (2013.01)

(58) Field of Classification Search
CPC ..... B62B 3/0625; B62B 3/0612; B62B 3/001; B62B 3/06; B62B 2301/04; B62B 2301/254; B62B 2301/14; B62B 2203/20; B62B 2203/28
See application file for complete search history.

(56) References Cited

U.S. PATENT DOCUMENTS 2,234,925 A * 3/1941 Hastings, Jr. ......... B62B 3/0625
280/43.12
2,274,164 A * 2/1942 Quayle ................. B62B 3/0625
254/2 C 2,598,151 A * 5/1952 Warshaw .............. B62B 3/0612
280/43.12
3,243,194 A 3/1966 Trusock
4,027,771 A * 6/1977 Adams .................. B62B 3/0625
280/43.12

(Continued)

FOREIGN PATENT DOCUMENTS

DE 102018119346 A1 2/2020
GB 820228 A 9/1959

OTHER PUBLICATIONS

Invitation to Pay Additional Fees, received in International Application No. PCT/IB2024/054936, mailed May 21, 2024.

*Primary Examiner* — Seahee Hong
(74) *Attorney, Agent, or Firm* — Riverside Law LLP

(57) ABSTRACT

The disclosure described herein relates to compact lift-and-steer wheel assemblies. An assembly includes a housing, a rotational assembly, a linkage, and at least one wheel. The wheel is pivotably coupled to a bracket of the rotational assembly via a wheel mount and a pivoting member. The linkage is coupled to the pivoting member of the rotational assembly via a steering member. The assembly is configured to rotate the wheel through an opening of the housing from a first position to a second position based on the linkage translating a first distance within the housing. The assembly is configured to pivot the wheel about the rotation assembly from the second position to a third position based on the linkage translating a second distance within the housing. An adjustable cantilever wheel system is configured to suspend the assembly above ground level to allow insertion at a raised height.

20 Claims, 33 Drawing Sheets

(56)     References Cited

U.S. PATENT DOCUMENTS

| | | | | |
|---|---|---|---|---|
| 9,714,047 B1 * | 7/2017 | Shunli | .................... | B62B 3/001 |
| 2006/0243509 A1 * | 11/2006 | Hellmann | ................ | B62B 3/06 |
| | | | | 180/209 |
| 2013/0277929 A1 * | 10/2013 | Thorsen | ................... | B62B 3/06 |
| | | | | 280/43.12 |
| 2015/0336781 A1 | 11/2015 | Neubauer | | |

* cited by examiner

100

104

100

106    108

102

Prior Art top deck boards length lead edge boards width lead edge board chamfer stringer notch bottom deckboards overall height opening height

FIG. 7F-1                                    FIG. 7F-2

NESTED LIFT-AND-STEER SUPPORT WHEELS

CROSS-REFERENCE TO RELATED APPLICATIONS

This application is a continuation of U.S. patent application Ser. No. 18/670,333, filed May 21, 2024, which claims priority to U.S. patent application No. 63/467,982, filed May 21, 2023, the contents of which are incorporated herein by reference in their entirety.

BACKGROUND

There are many types of material handling machines in use for many applications, but with pallets being a very broadly used means of transporting product, pallet moving machines are perhaps the most prolific. A common pallet moving machine is the "walkie style" machine. This pallet moving machine typically has a drive unit at one end (i.e., the drive end or the "A-frame") and two forks extending towards the opposite end of the pallet moving machine, each fork having a support wheel near its end to support a load on the fork. The forks are generally inserted into or under a pallet to lift and transport the pallet. However, these pallet moving machines experience difficulties in reliably engaging with US style pallets as the height of the forks with the support wheels is generally close to the height of the opening available in such pallets, meaning a tight fit when entering or exiting. Further, the support wheels must ride up over each of the bottom deck boards of the pallet as they travel in and out so together, this impacts the reliable engagement with such pallets and therefore limits the usability of such machines.

Further, as the support wheels mounted in the forks are only able to be oriented in one direction, being the travel direction, walkie style machines are also generally deficient in respect to maneuverability, increasing the required floor space to complete a maneuver, increasing the complexity of performing such maneuvers (particularly for an autonomous machine) and increasing the time required to complete such maneuvers. With non-steerable support wheels, such machines are unable to move laterally, such as to align the forks with a pallet or align a pallet with a pallet location, and they are unable to rotate about their own center, such as 90 or 180 degrees, to allow narrower aisleways in a facility and faster reorientation. Further, as these pallet moving machines implement non-steerable support wheels that have a small diameter, these wheels are generally problematic when traversing uneven floors, dock plates, and the like.

An alternative style pallet moving machine is a counterbalance style pallet mover. This type of pallet moving machine includes a large mass (often including a mass of steel, iron or even lead as a ballast) at the opposing end of the support wheels. Counterbalance pallet trucks, which include conventional "sit down" fork trucks and stand-up fork trucks, are able to use much thinner tines (vs. forks utilized in walkie style pallet movers). As such, the thinner tines, having less height, have more clearance to enter the narrow height of a US style pallet cavity. However, these pallet trucks require sufficient counterweight to balance the weight of the loaded pallet that is being supported by said tines. As a result, counterbalance trucks are significantly larger and heavier than walkie style pallet movers, rendering them less maneuverable and more dangerous due to a huge mass traveling at speed. Their increased size means they require wider aisles to operate in which ultimately impacts the storage density and throughput in any warehouse/logistics facility. Further, as these trucks are heavier, they necessitate the use of more heavy duty, higher capacity dock plate systems which in turn suffer more wear and damage over time. These trucks are generally also more expensive due to the extra components that comprise the mass and higher capacity drive components to propel that increased machine mass.

With the use of bottom deck pallets well established in many markets, most commonly the US, counterbalance pallet trucks are more frequently used in those markets than walkie style trucks, particularly when automated pallet moving is being considered and reliable autonomous engagement with pallets is a high priority. In contrast, as Europe had adopted a different standard for pallets (the EUR or Euro pallet) that was modified to eliminate the bottom deck boards, walkie style pallet movers are able to work more effectively there and due to their functional and commercial benefits are therefore more broadly used in Europe for the autonomous horizontal transport of pallets. As warehouse space has become more valuable and the size of aisleways for the travel of pallet moving machines is more scrutinized, the need for an improved walkie style of autonomous pallet moving machine has evolved, one that can reliably engage with either US or EUR style pallets and that is more maneuverable. The present invention satisfies these needs.

SUMMARY

The present disclosure relates generally to pallet moving machines, and more particularly, to lift-and-steer support wheel assemblies nested within forks of a pallet moving machine.

In one or more aspects, the disclosed technology relates to a walkie style of pallet mover that has forks that are able to enter and exit bottom deck (US style) pallets more reliably, particularly on uneven flooring as is common in warehouse environments, and particularly when operating autonomously.

In one or more aspects, the disclosed technology relates to performing more maneuvers, in less space and more quickly, including allowing the machine to rotate about its own center and to move laterally, such as to align with a pallet or pallet location.

In one or more aspects, the disclosed technology relates to support wheels that are of a larger diameter, that can be used as a lifting member to raise the forks in which they are mounted, and may then when raised and reoriented adopt different orientations to provide the required maneuverability with the larger diameter of wheels allowing superior travel over uneven flooring, particularly when traversing dock plates.

In one or more aspects, the disclosed technology relates to an assembly comprising a housing having an opening disposed at the bottom of the housing. In one or more cases, the assembly comprises a rotational assembly on a longitudinal axis of the housing. In one or more cases, the rotational assembly comprises a bracket rotatably coupled to an interior of the housing. At least one wheel is pivotably coupled to the bracket of the rotational assembly via a wheel mount and a pivoting member. The wheel mount and pivoting member is disposed on opposing sides of the bracket.

In one or more aspects, the disclosed technology relates to an assembly comprising a housing having an opening disposed at the bottom of the housing. In one or more cases, the assembly comprises a rotational assembly on a longitudinal axis of the housing. In one or more cases, the rotational assembly comprises a bracket rotatably coupled to an interior of the housing. In one or more cases, a wheel is pivotably coupled to the bracket of the rotational assembly via a wheel mount and a pivoting member. In one or more cases, the wheel mount and pivoting member is disposed on opposing sides of the bracket. In one or more cases, the assembly comprises a steering arm extending along the longitudinal axis of the housing. In one or more cases, a distal end of the steering arm is coupled to the pivoting member of the rotational assembly. In one or more cases, in a first position, the bracket and the wheel of the rotational assembly are arranged within the housing at a first angle with respect to the steering arm. In one or more cases, in a second position, the steering arm is translated a first distance towards a proximal end of the housing, such that the bracket and the wheel of the rotational assembly rotate through the opening of the housing to a second angle with respect to the steering arm. In one or more cases, in a third position, the steering arm is translated a second distance towards the proximal end of the housing, wherein the pivoting member rotates about the distal end of the steering arm, such that the wheel pivots about the bracket of the rotational assembly based on the rotation of the pivoting member.

In one or more aspects, the disclosed technology relates to a material handling device comprising a driven end and a lifting end. In one or more cases, the material handling device comprises a pair of housings connected to and extending from the driven end. In one or more cases, the material handling device comprises a torque shaft horizontally disposed within the driven end. In one or more cases, the torque shaft is rotatable coupled to proximal ends of a first linkage and a second linkage. In one or more cases, the first linkage and the second linkage are configured to respectively translate along a longitudinal axis of each respective housing of the pair of housings. In one or more cases, the material handling device comprises at least one actuator vertically disposed within the driven end. In one or more cases, a first end of the at least one actuator is coupled to a portion of the driven end, and a second end of the at least one actuator is rotatably coupled to the torque shaft. In one or more cases, the at least one actuator is configured to drive, via the torque shaft, the first linkage and the second linkage. In one or more cases, each housing comprises a rotational assembly configured to extend from an opening disposed on a bottom of the housing on the longitudinal axis of the housing. In one or more cases, the rotational assembly comprises a bracket rotatably coupled to an interior of the housing. In one or more cases, at least one wheel is pivotably coupled to the bracket of the rotational assembly via a wheel mount and a pivoting member. In one or more cases, the wheel mount and pivoting member are disposed on opposing sides of the bracket. In one or more cases, the rotational assembly is configured to transition the at least one wheel from a first position being located within the housing to a second position being located outside of the housing to a third position in which a heading of the at least one wheel is oriented.

In one or more aspects, the disclosed technology relates to a material handling device comprising a driven end and a lifting end. In one or more cases, the material handling device comprises a pair of housings connected to and extending from the driven end. In one or more cases, the material handling device comprises a torque shaft horizontally disposed within the driven end. In one or more cases, the torque shaft is rotatable coupled to proximal ends of a first linkage and a second linkage. In one or more cases, the first linkage and the second linkage are configured to respectively translate along a longitudinal axis of each respective housing of the pair of housings. In one or more cases, the material handling device comprises at least one actuator vertically disposed within the driven end. In one or more cases, a first end of the at least one actuator is coupled to a portion of the driven end, and a second end of the at least one actuator is rotatably coupled to the torque shaft. In one or more cases, the at least one actuator is configured to drive, via the torque shaft, the first linkage and the second linkage. In one or more cases, the material handling device comprises at least one cantilever wheel configured to adjust a height of the driven end of the material handling device. In one or more cases, the at least one cantilever wheel comprising a mount positioned within the driven end. In one or more cases, the mount has a first end coupled to the at least one cantilever wheel and a second end coupled to a third actuator via a third linkage. In one or more cases, the third actuator is configured to extend the third linkage, such that the mount rotates the at least one cantilever wheel from a first state to a second state, such that the driven end is positioned at a first height. In one or more cases, the third actuator is configured to retract the third linkage, such that the mount rotates the at least one cantilever wheel from the second state to the first state, such that the driven end is positioned at a second height.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description.

FIGS. 7F-1 and 7F-2 illustrate enlarged views of a rotation assembly of the example NLS support wheel system.

FIG. 7K-1 illustrates a side view taken along a first cross section of an example NLS support wheel system positioned in a more elevated state and example cantilevered wheels deployed from the A-frame of the example pallet moving machine. FIG. 7K-2A illustrates another side view taken along a second cross section of an example NLS support wheel system positioned in a more elevated state and example cantilevered wheels deployed from the A-frame of the example pallet moving machine. FIG. 7K-2B illustrates an enlarged view of the second cross section.

FIG. 7M-1 illustrates a side view taken along a first cross section of an example NLS support wheel system positioned in the deployed state and in the normal travel orientation, with the example cantilevered wheels nested in the A-frame of the example pallet moving machine. FIG. 7M-2A illustrates another side view taken along a second cross section of an example NLS support wheel system positioned in the deployed state and in the normal travel orientation, with the example cantilevered wheels nested in the A-frame of the example pallet moving machine. FIG. 7M-2B illustrates an enlarged view of the second cross section.

DETAILED DESCRIPTION

Figures 1A, 1B, 1C:
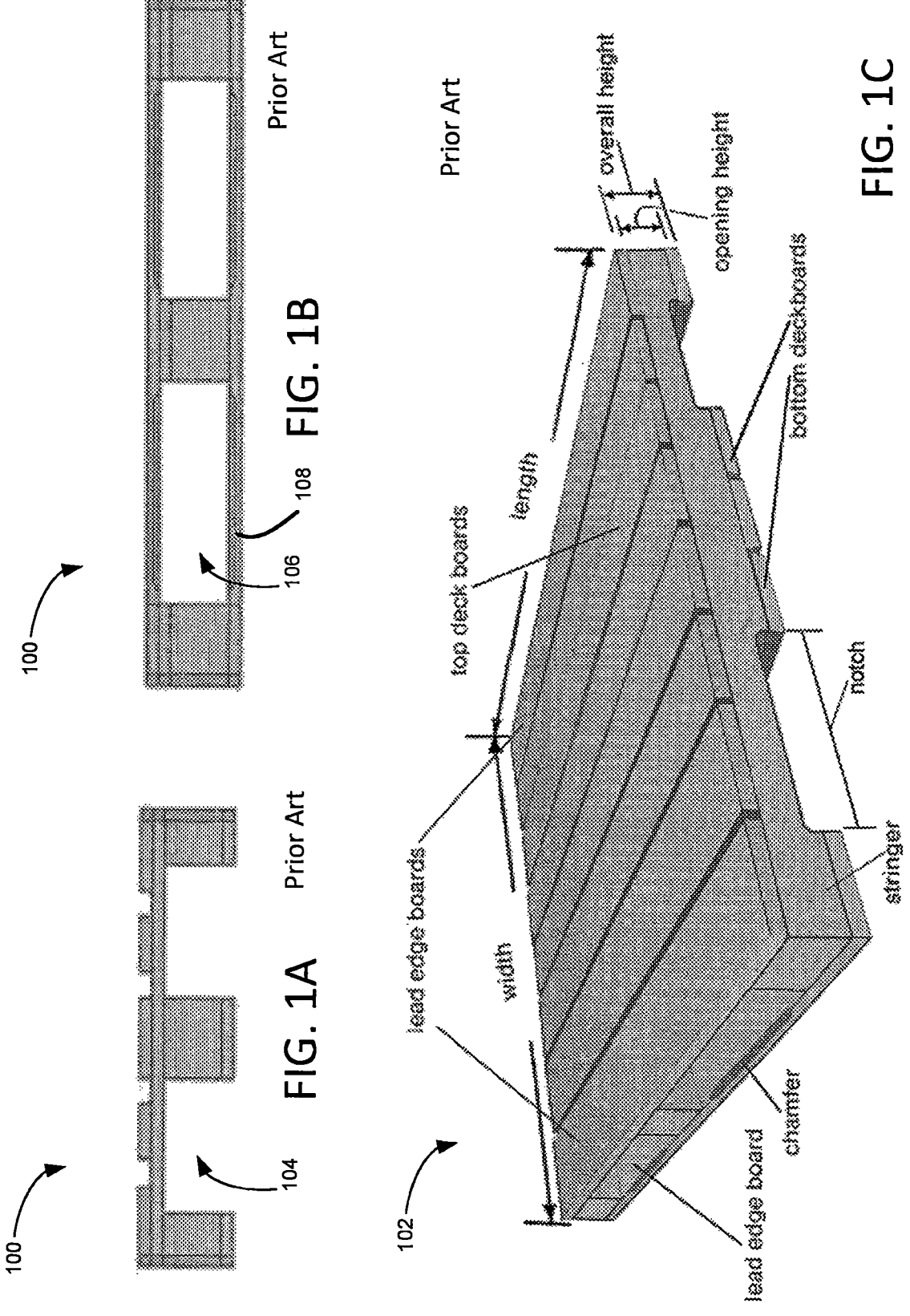
FIGS. 1A and 1B illustrate side views of an example European-style pallet.
FIG. 1C illustrates an isometric view of an example United States-style bottom deck pallet.

The following discussion omits or only briefly describes conventional features of pallet movers that are apparent to those skilled in the art. It is noted that various embodiments are described in detail with reference to the drawings, in which like reference numerals represent like parts and assemblies throughout the several views. Reference to various embodiments or examples does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations.

Unless otherwise specifically defined herein, all terms are to be given their broadest reasonable interpretation including meanings implied from the specification as well as meanings understood by those skilled in the art and/or as defined in dictionaries, treatises, etc. It is noted that, as used in the specification and the appended claims, the singular forms "a," "an" and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof.

Relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively or operably connected" is such an attachment, coupling or connection that allows the pertinent structures to operate as intended by virtue of that relationship.

Reference throughout the specification to "one embodiment", "an embodiment" or "some embodiments" means that a particular feature, structure, or characteristic described in connection with an embodiment is included in at least one embodiment of the subject matter disclosed. Thus, the appearance of the phrases "in one embodiment", "in an embodiment" or "in some embodiments" in various places throughout the specification is not necessarily referring to the same embodiment. Further, the particular features, structures or characteristics of "one embodiment", "an embodiment" or "some embodiments" may be combined in any suitable manner with each other to form additional embodiments of such combinations. It is intended that embodiments of the disclosed subject matter cover modifications and variations thereof. Terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Moreover, throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range. As used herein, the term "about" in reference to a measurable value, such as an amount, a temporal duration, and the like, is meant to include the specified value and/or encompass variations of plus or minus 20%, plus or minus 10%, plus or minus 5%, plus or minus 1%, and plus or minus 0.1% of the specified value, as such variations are appropriate.

Conventional material handling systems, such as pallet moving machines, have their drawbacks and are inherently limited. For example, walkie style pallet moving machines typically have their forks drop very close to floor level so that the forks can enter the cavity of a pallet. When dropped, the top of the forks are typically 75 mm from ground height. The opening of a cavity in a pallet is typically 80 mm to 100 mm based on whether the pallet is a European style pallet, as illustrated in FIGS. 1A and 1B, or a United States/United Kingdom style pallet, as illustrated in FIG. 1C. FIGS. 1A and 1B illustrate a standard European style pallet 100. The cavity 104 on an end of the pallet 100 typically has an opening height of 100 mm with no bottom deck board such that each fork may roll into the respective cavity at ground level. The cavity 106 on a side of the pallet 100 has an opening height of 100 mm; however, the side of the cavity 106 includes a bottom deck board 108. As such, to enter the cavity 106, a support wheel rolls up and over the deck board 108 to enter the cavity 106. FIG. 1C illustrate a standard United States/United Kingdom style pallet 102. The pallet 102 is generally less standardized in terms of design and dimensions. In most cases, pallet 102 includes bottom deck boards extending along the lower length and width of the pallet 102. Moreover, the opening height of the cavities of the pallet 102 typically range from 80 mm to 85 mm, but can in fact vary from this range also. (The vertical span from the underside of the top deck to the floor is about 100 mm, same as for a Euro pallet, but that space is reduced by the thickness of the bottom deck board, typically 10 mm to 15 mm). Therefore, the support wheels typically need to roll up and over the bottom deck boards of pallet 102, whether going into the pallet or exiting out of the pallet.

Figure 2A:
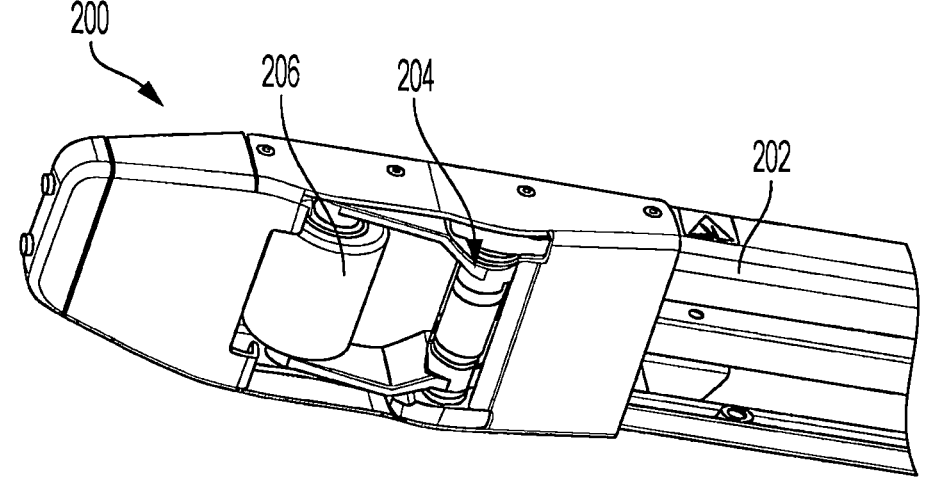
FIG. 2A illustrates a conventional pallet moving fork with the mounted support wheel in a retracted position.
Figure 2B:
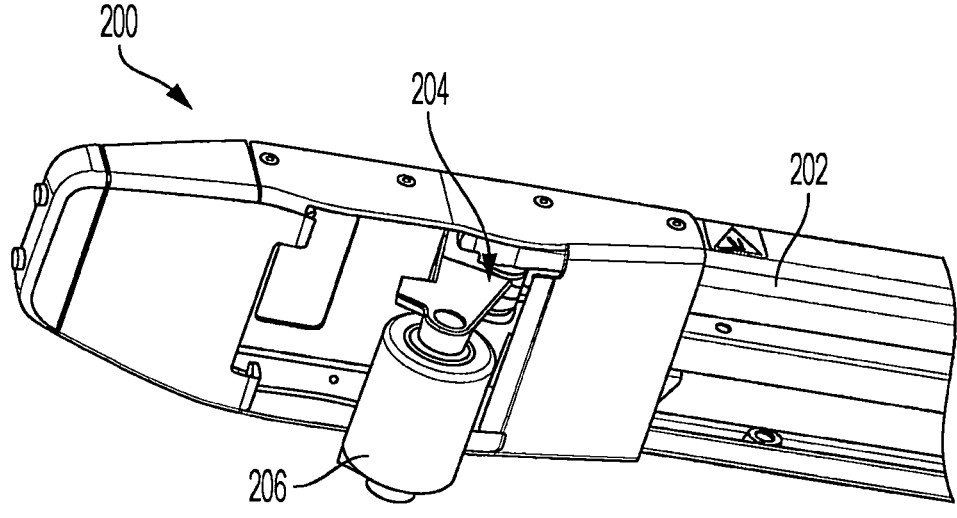
FIG. 2B illustrates the conventional pallet moving fork with the support wheel in a deployed position.

FIGS. 2A and 2B illustrate a conventional, single support wheel 206 arranged within a pallet mover fork 202, that is actuated via a push-rod assembly 204. FIG. 2A illustrates the wheel 206 being positioned in a nested position within the fork 202. The wheel 206 typically has a diameter of about 75 mm, as this is generally considered the smallest practical diameter that can fit into a US pallet, and the larger the wheel diameter the more smoothly it runs (lower rolling resistance). The bottom of the wheel 206 is the lowest point in the fork 202 and allows the pallet moving machine to move around when the forks are lowered. The forks may enter a cavity in the nested position. Once entered into the cavity, the wheels 206 are pushed down, pivoting on a pair of arms that are typically actuated by the push rod assembly 204 and, thus lifting the forks 202 almost parallel to the ground and allowing the pallet, once lifted from the ground, to be horizontally transported. The forks 202 (and the pallet) are typically lifted 150 mm to 220 mm above the lowered height of the forks 202. If entering/exiting the United States/United Kingdom style pallet 102 having bottom deck boards, the wheels 206 ride up over the bottom deck boards and back down to the ground as the forks 202 enter the pallet cavity. If entering/exiting European style pallet 100 having no bottom deck boards, the forks 202 travel in/out of the cavities at ground level. However, these support wheels 206 are generally oriented in only one direction, thereby greatly limiting the maneuverability of pallet moving machines. Moreover, the small diameter of the support wheels 206 typically have increased rolling resistance and have difficulty traversing floor imperfections.

The nested lift-and-steer (NLS) support wheel system examples described herein provide increased maneuverability in tight spaces. Moreover, the examples described herein provide a reduced rolling resistance, thereby allowing the NLS support wheel systems to more easily traverse floor imperfections. Examples of the disclosed nested lift-and-steer support wheel systems are described below with reference to the Figures.

Figure 3A:
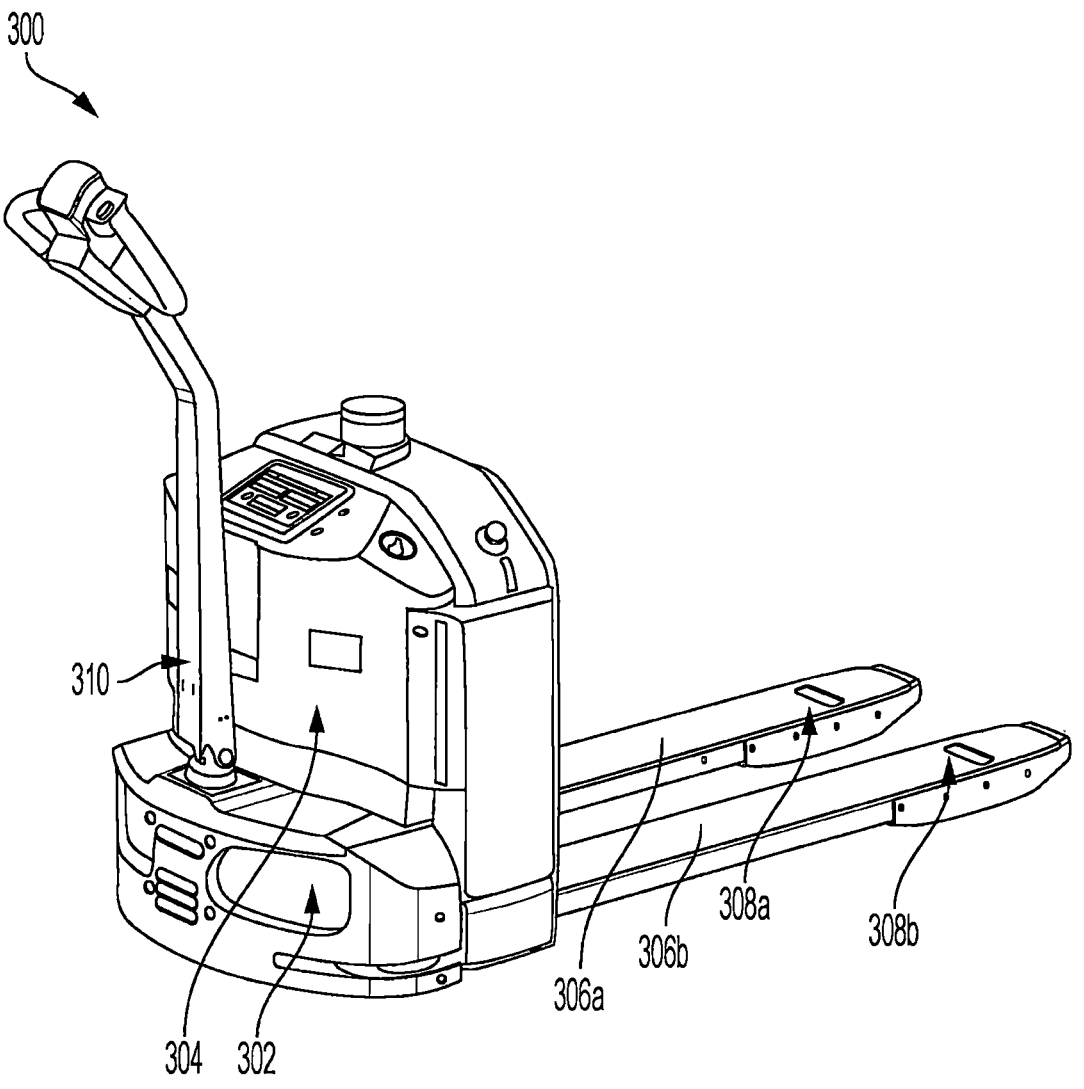
FIG. 3A illustrates an isometric view of an A-frame style of pallet moving machine.
Figure 3B:
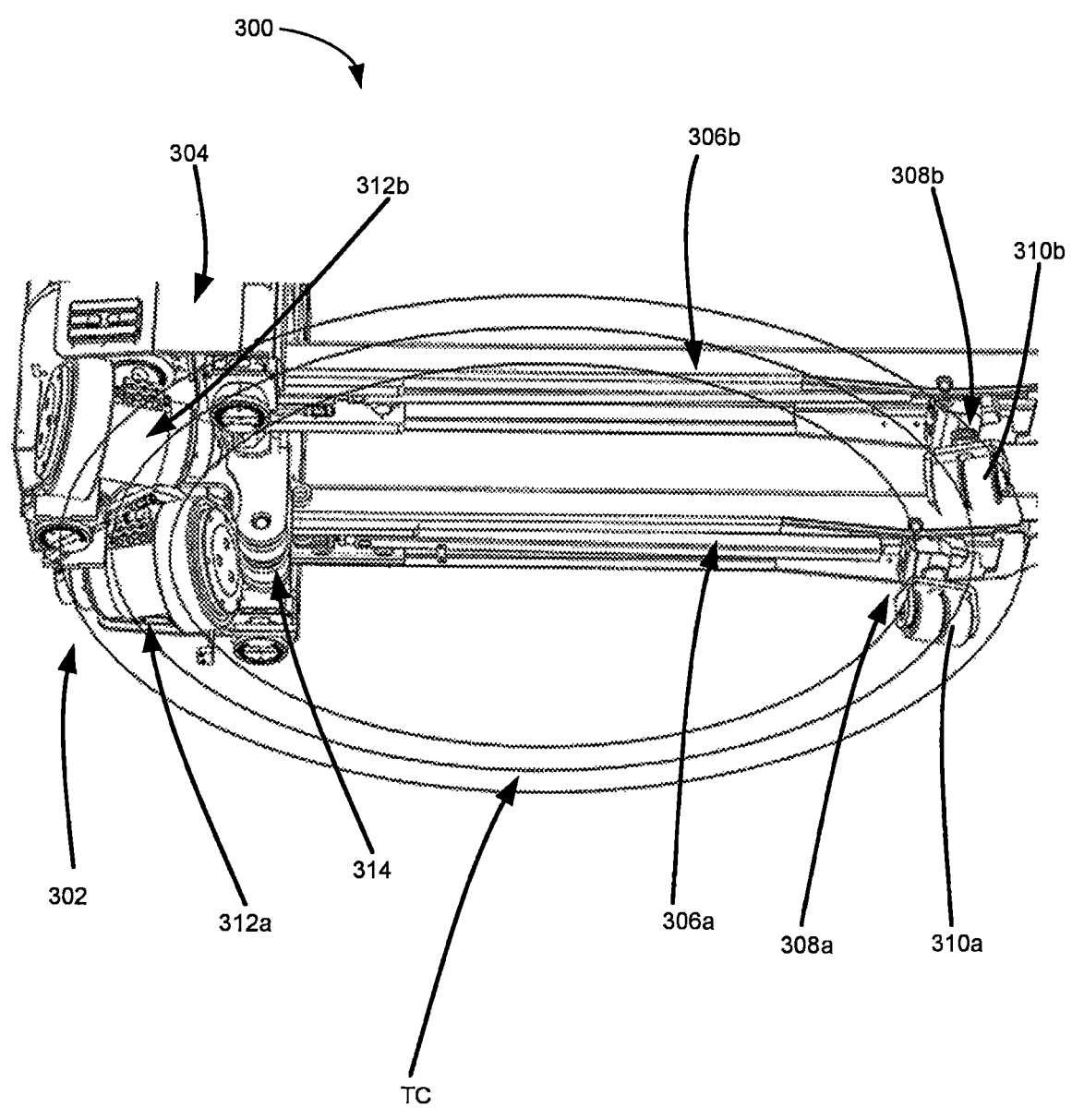
FIG. 3B illustrates a bottom view of the pallet moving machine, in this case having the driven wheels and support wheels oriented to allow rotation about center.

FIG. 3A illustrates an example pallet moving machine (hereinafter "machine 300"). In one or more cases, the machine 300 is configured to operate entirely autonomously. In one or more other cases, one or more portions of the machine 300 are configured to operate manually and one or more other portions of the machine 300 are configured to operate via one or more computer systems. In one or more cases, the machine 300 may include a housing, such as the A-frame 304, that typically houses one or more of the electronic(s), the computing/control system(s) and one or more batteries, and below the A-frame 304, the drive assembly 302. The A-frame 304 and drive assembly 302 may be operably coupled to forks 306a and 306b. The forks 306a and 306b may each include a NLS support wheel system, such as systems 308a and 308b, respectively. The systems 308a, 308b may be disposed on the distal end portions of the forks 306a and 306b. For example, wheels 310a, 310b of the respective systems 308a, 308b may be located along the length of the forks 306a, 306b corresponding to a diameter of a turning circle TC of the machine 300, as illustrated in FIG. 3B. In some cases, the wheels 310a, 310b are configured to pivot about their respective vertical axes (as illustrated in FIG. 3B), such that the direction (i.e., the heading of each wheel 310a and 310b) of the wheels 310a, 310b change based on the pivot of the respective wheel 310a and 310b. In other cases, the wheels 310a and 310b remain in a fixed direction (i.e., non-steerable), such that the wheels 310a and 310b do not circumferentially pivot about their respective vertical axes. The machine 300 may be configured such that the forks 306a, 306b raise upwards and downwards to lift and subsequently move objects, such as a pallet. In some cases, the machine 300 optionally includes a handle 310 operably coupled to the drive assembly 302. The handle 310 may be utilized as a steering mechanism for an operator to control the speed and direction of movement of the machine 300. In some cases, the drive assembly 302 of the machine 300 includes two drive wheels 312a, 312b located on both sides of the A-frame 304, as illustrated in FIG. 3B. In other cases, the drive assembly 302 includes a single driven wheel in the center of the A-frame 304. The drive assembly 302 is configured to drive and steer the wheels 312a, 312b. The drive assembly 302 may include one or more features from the drive assembly 102, the displaced differential drive system 200, and the displaced differential drive system 300 as described in application Number: PCT/IB2024/053632, which is hereby incorporated by reference in its entirety.

In one or more cases, the systems 308a, 308b each provide a support wheel that is configured to be nested within the respective fork. For example, system 308a may include wheel 310a that is nested within the fork 306a, and the system 308b may include wheel 310b that is nested within the fork 306b. In one or more cases, the wheels 310a, 310b of the systems 308a, 308b may each have a large diameter such as, but not limited to, about 150 mm or about 6 inches. The larger diameter wheels provide a lower rolling resistance. As such, the larger wheels 310a, 310b may rotate more quietly and smoothly than smaller diameter wheels. Further, the larger wheels 310a, 310b may more easily traverse uneven floors, such as uneven concrete floor slabs, or obstacles, such as broken pieces of pallet wood on the floor. For instance, dock plates or dock levelers are ground-level imperfections that present a problem for conventional walkie style pallet movers. Dock levelers or dock plates typically span the space and accommodate the height difference between the back of a truck or trailer and the dock floor. Thus, the dock levelers or dock plates serve as a ramp that compensates for the change in height between the (unchanging) dock floor height and the changing (as weight is loaded into or unloaded from) truck. The load change causes the suspension of the truck to compress or decompress and so rise or fall during the loading/unloading process. The larger diameter wheels 310a, 310b of systems 308a, 308b allow the machine 300 to traverse such uneven surfaces, such as those dock plates or dock levelers, much more smoothly and without destabilizing the pallet load being moved or causing impact damage to the wheels 310a, 310b or machine 300. In one or more other cases, the wheels 310a, 310b of the systems 308a, 308b may each have a diameter such as, but not limited to, about 75 mm. As such, the systems 308a, 308b provide broad maneuverability of the machine 300 in tight spaces, such as the back of a delivery truck, as well as significantly lowering the weight of the machine 300. Further, the systems 308a, 308b may be implemented in robotic or autonomous load movers in which the load travels at the same fork height (i.e., when the support wheels are in a plan perpendicular to the robotic or autonomous load mover). By traveling in the same plan, the computations to determine adjustments to the orientation of the wheels 310a, 310b may be easily calculated and the required movements of the robotic or autonomous load mover may be automatically implemented.

While the wheels 310a, 310b are nested within the forks 306a, 306b, or at least a majority of each of the wheels 310a, 310b are nested within the forks 306a, 306b, the forks 306a, 306b may enter the respective cavities of a pallet, such as pallet 100 or pallet 102. When positioned within the pallet cavities, the systems 308a, 308b may transition the wheels 310a, 310b from a nested state to a deployed state. The systems 308a, 308b may transition the wheels 310a, 310b from a nested state to a deployed state by lowering the wheels 310a, 310b to the floor until the wheels 310a, 310b lift the forks 306a, 306b and, in turn, the pallet, to allow horizontal travel. That is, the wheels 310a, 310b may act as a lever to raise the forks 306a, 306b and pallet from the ground. The machine 300 may include cantilevered wheels 314 positioned near or under the A-frame 104. The cantilevered wheels 314 may be used to stabilize the machine 300 when moving. For example, the cantilevered wheels 314 may stabilize the A-frame 304 when the forks 306a, 306b enter the cavity of a pallet while the wheels 310a, 310b are in a nested state. For the cases in which the wheels 310a, 310b are steerable, the wheels 310a, 310b allow the machine 300 to move in a variety of directions of travel, such as, but not limited to, straight travel, lateral travel, and rotation about the center of the machine 300. Further, the wheels 310a, 310b may provide the machine 300 and drive assembly 302 with a variety of ways to steer, such as, but not limited to, Ackermann-style steering, all-wheel steering, and the like.

In one or more cases, the systems 308a, 308b and the respective forks 306a, 306b may be sized to translate within a space of about 100 mm in height by 200 mm in width (e.g., a cavity 104 of pallet 100) and/or a space of about 75 mm in height by 200 mm in width (e.g., a cavity of pallet 102). In one or more cases, the systems 308a, 308b may be configured to handle forces applied to the systems 308a, 308b when lifting and/or lowering forks 306a, 306b and when traveling or maneuvering the device 300. Further, in one or more cases, systems 308a, 308b, and in particular, wheels 310a, 310b, may be configured to move the forks 306a, 306b up and "back" towards the A-frame 304 of the machine 300.

Figures 4A, 4B:
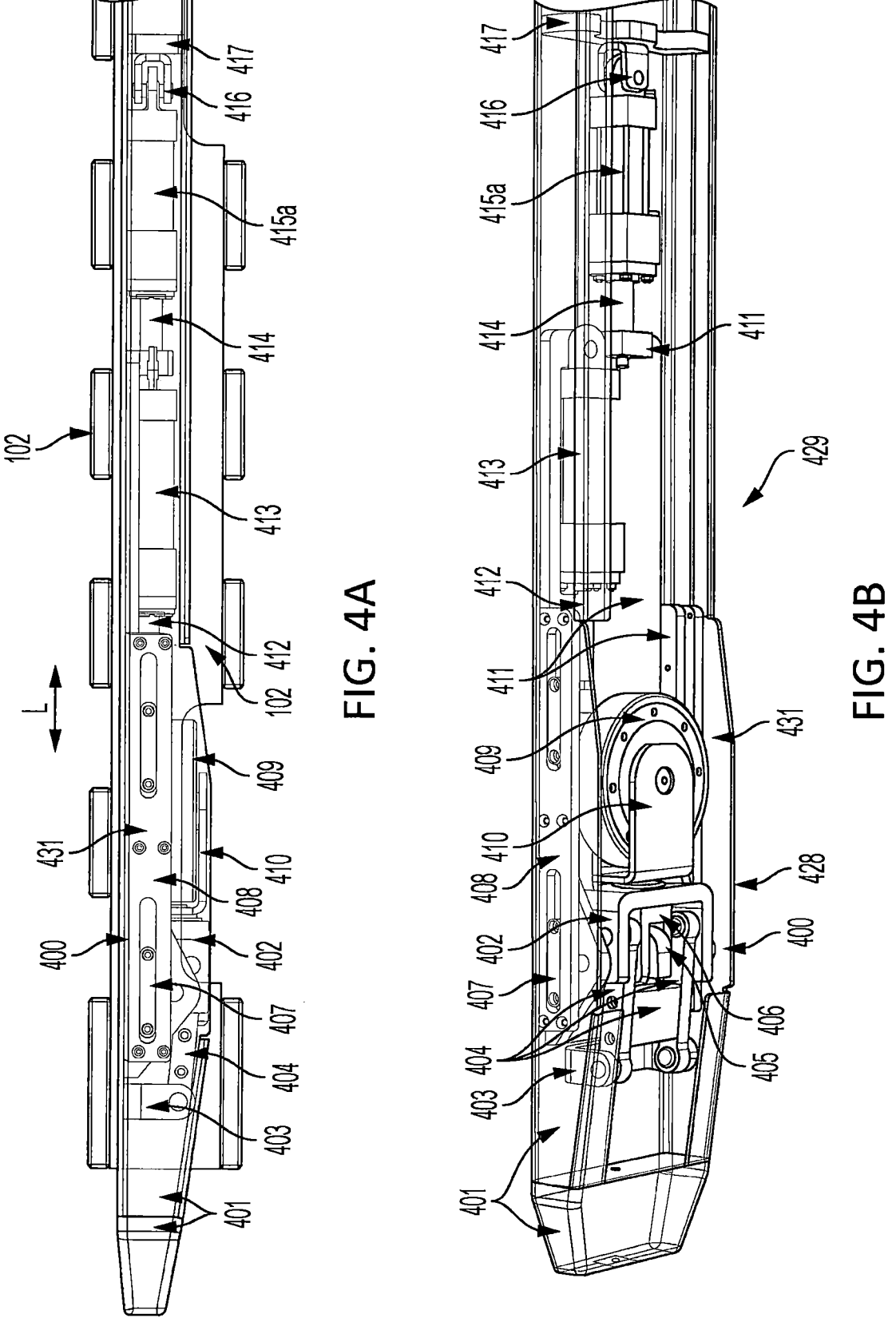
FIG. 4A illustrates an example fork and example nested lift-and-steer (NLS) support wheel system positioned within the fork.
FIG. 4B illustrates a bottom isometric view of the example fork and example NLS support wheel system of FIG. 4A.
Figures 4C, 4D, 4E:
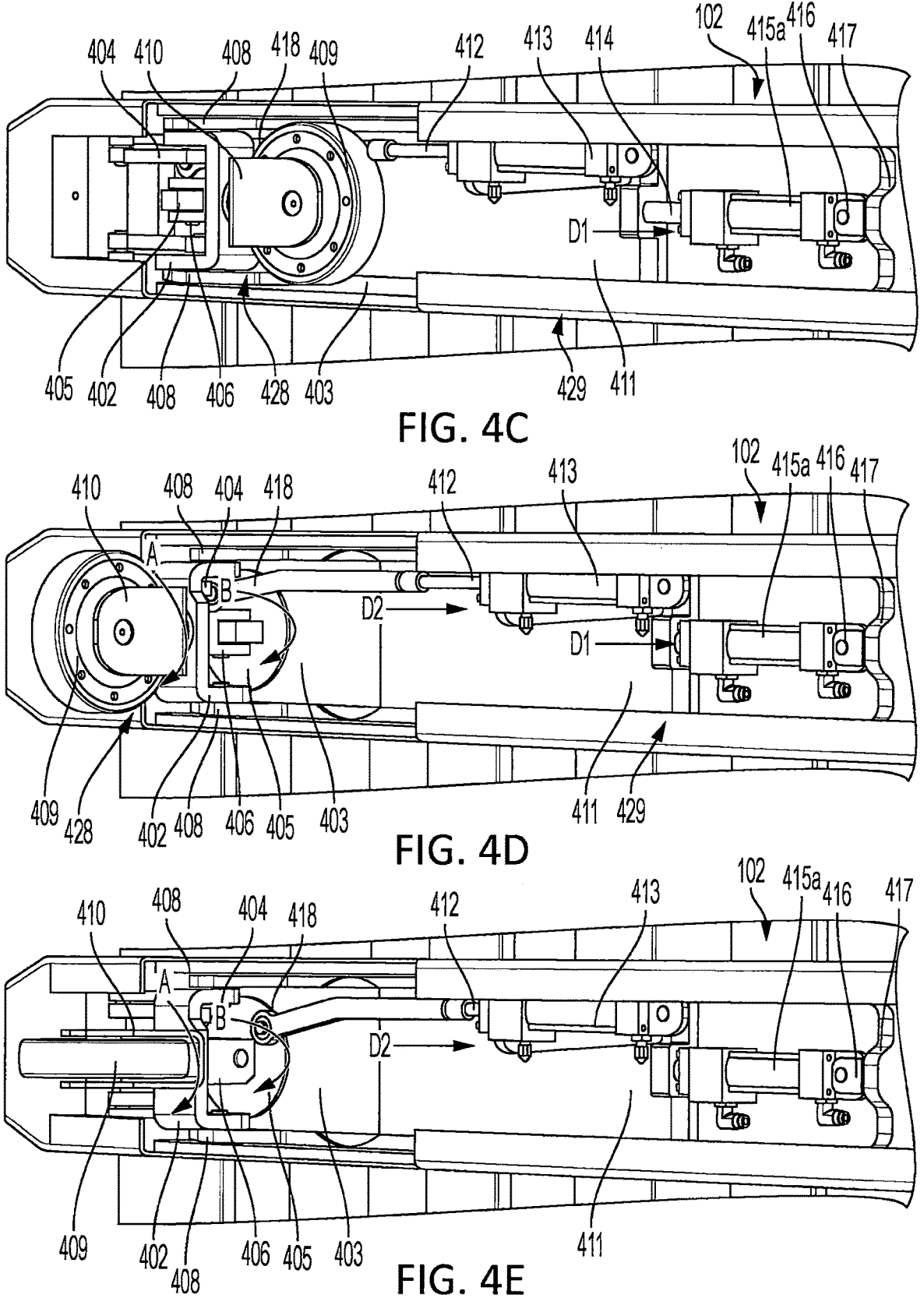
FIGS. 4C-4E illustrate the example fork and example NLS support wheel system transitioning from a nested state to a deployed state within a pallet.

FIG. 4A illustrates an example fork 401 and an example NLS support wheel system 400 (hereinafter "system 400") positioned within the fork 401. FIG. 4B illustrates a bottom isometric view of the example fork 401 and system 400. FIGS. 4C-4E illustrate the fork 401 and system 400 transitioning from a nested state to a deployed state within the pallet 102. It is noted that the fork 401 and system 400 may be utilized by machine 300 in a same or similar manner as forks 306a, 306b, and systems 308a, 308b.

In one or more cases, the fork 401 may include a cavity 431 sized to house system 400. The fork 401 may have a size, structure, and shape similar to or the same as a conventional fork for a pallet moving machine, such as machine 300. The system 400 includes a steering assembly 428 and a lifting assembly 429. The lifting assembly 429 includes a plurality of the components configured to transition the wheel 409 between a nested state and deployed state in order to raise or lower the position of the fork 401. The steering assembly 428 includes a plurality of the components configured to rotate the wheel 409 to orient and steer the wheel 409 in a deployed state. The system 400 may be configured to translate within the cavity 431 to transition the system 400 between a nested state and a deployed state. The wheel 409 may have a diameter of about 150 mm and a width of about 35 mm. As such, when the wheel 409 is oriented parallel with the ground (i.e., in a nested state), the wheel 409 may fit within a cavity of a pallet, such as pallet 102. The cavity of the pallet 102 may be about 75 mm.

In a nested state, the wheel 409 is configured in a horizontal orientation such that the wheel 409 is nested entirely within the cavity 431 of the fork 401, or such that a majority of the wheel 409 is nested within the cavity 431 of the fork 401. In the horizontal orientation, as illustrated in FIGS. 4A and 4B, the sides of the wheel 409 are oriented to be parallel with the length L of the fork 401. When transitioning the wheel 409 from a nested state to a deployed state, the wheel 409 may be used as a lifting member to lift the pallet 102 off the ground, while simultaneously rolling/orienting the wheel 409 in a perpendicular direction to the fork 401. In a deployed state, the wheel 409 is configured in a vertical orientation, such that the wheel 409 is oriented to be perpendicular to the length L of the fork 401. When transitioning the wheel 409 from a deployed state to a nested state, the wheel 409 may be used as a lowering member to lower the pallet 102 onto the ground, while simultaneously rolling/orienting the wheel 409 into a direction parallel to the fork 401.

The wheel 409 is operably coupled with pivot arm 404 via bracket 402 and a wheel support 410. The pivot arm 404 is pivotably coupled with the fork 401 via the mount 403. The mount 403 may be fixed to the fork 401 and may support the pivot arm 404, such that the wheel 409 and pivot arm 404 pivot about a proximal end of the mount 403. The pivot arm 404 may act as a guide and brace to the bracket 402. The bracket 402 may be a pivotal bracket in which the pivot arm 404 pivots about to move the wheel mount 406 and wheel support 410, and in turn, the wheel 409, from a nested state to a deployed and vice versa. The bracket 402 may be fixedly coupled with rails 408 disposed on opposite sides of the fork 401. The rails 408 may be fixed to the fork 401.

In one or more cases, the wheel mount 406 may be coupled to a rotation mount 405, such that the wheel mount 406 may pivot about the rotation mount 405. The rotation mount 405 may be a cylindrical disk configured to rotate within the cavity of the fork 401. The rotation mount 405 may be operably coupled to the mount 403 and configured to rotate in a circumferential direction B, as illustrated in FIG. 4D. The wheel mount 406 may be coupled to the rotation mount, such that the wheel mount 406 may rotate based on the rotation of the rotation mount 405. As such, the wheel 409 may be oriented (e.g., steered) as the rotation mount 405 rotates. For example, as the rotation mount 405 rotates in direction B, the wheel 409 may rotate in corresponding direction A. To rotate the rotation mount 405, a steering arm 418 may be coupled to the rotation mount 405 and an actuator 413. One end of the steering arm 418 may be pivotably coupled to a portion of the rotation mount 405, and an opposite end of the steering arm 418 may be fixed to a rod 412 of the actuator 413. The actuator 413 may move the rod 412 along the length L of the fork 401. The actuator 413 may push or pull the rod 412, and thus, push or pull the steering mechanism 418 to rotate the rotation mount 405. For example, by pulling the rod 412 and steering mechanism 418 in direction D2, the rotation mount 405 may rotate in direction B (e.g., a clockwise direction). In another example, by pushing the rod 412 and steering mechanism 418 in a direction opposite of direction D2, the rotation mount 405 may rotate in a counterclockwise direction. The actuator 413 may be a linear actuator. The linear actuator may be, for example, hydraulic, pneumatic, or electric (e.g., by rotating via a threaded rod). The actuator 413 may provide an indication of positional feedback to determine the orientation the wheel 409 has been rotated. An encoder may be operably coupled with the actuator (e.g., an electric linear actuator) to provide the indication of positional feedback of the actuator 413.

The actuator 413 may be coupled with a sled 411 that is configured to axially translate along the length L of the fork 401. In one or more cases, the wheel assembly and steering assembly are mounted to the sled 411. The sled 411 is configured to move in its entirety, such that during lifting or lowering, there is not a tendency to reorient (i.e., steer) the wheel 409, and once lifted (i.e., configured in a deployed state), the wheel 409 may be steered independent from the sled 411. A proximal end of the sled 411 may be coupled to an actuator 415a via rod 414. The actuator 415a may be positioned within the fork 401. An end of the actuator 415a opposite the rod 414 may be pivotably coupled to a pivoting mount 416 of a stop mount 417. The stop mount 417 may be cross-member fixed within the cavity of the fork 401. The pivoting mount 416 allows the actuator 415a to change angles as the actuator 415a pushes or pulls the sled 411. When pushing or pulling the sled 411, the actuator 415a may push or pull against the stop mount 417 to either push or pull the sled 411.

The actuator 415a may push or pull the rod 414 to move the sled 411 along the length L of the fork 401. By moving the sled 411 along the length of the fork 401, the wheel 409 may in turn transition between a nested state and a deployed state. For example, the actuator 415a may pull the rod 414 in direction D1 as illustrated in FIG. 4C. By moving the rod 414 in direction D1, the sled 411 moves in corresponding direction D2. As the sled 411 moves in direction D2, the actuator 413, rod 412, and steering arm 418 move in direction D2, and in turn, rotate the rotation mount 405 in direction B. As the rotation mount 405 rotates in direction B, the wheel 409 may transition from a nested state to a deployed state, as illustrated in FIGS. 4C and 4D. The actuator 413 may then actuate rod 412 to orient the wheel 409 via the steering arm 418. To transition the wheel 409 from the deployed state to the nested state, the actuator 415a may push the rod 414, and in turn, the sled 411, in the opposite direction of direction D1 and direction D2. As the sled 411 moves in the opposite direction of direction D2, the steering arm 418 rotates the rotation mount 405 in a counterclockwise direction, thereby transitioning the wheel 409 from the deployed state to the nested state.

In one or more cases, the rails 408 may include one or more guide blocks 407 that are configured to slide along the length L of the fork 401. The guide blocks 407 may be made of a low friction material, such as bronze, brass, or other like material. The guide blocks 407 may be positioned to slide within channels of rails 408 and serve to guide the travel of the sled 411 along the fork 401. In one or more cases, the guide blocks 407 are configured to transfer forces generated by a load to the rails 408 and the fork 401. In one or more cases, the rails 408 are positioned on opposing sides of the sled 411 and constrain the travel of the sled 411 via guide blocks 407 that may slide within the channels of the rails 408. The rails 408 and guide blocks 407 may transfer, for example, vertical forces of a load being transported by a pallet moving machine. For example, the rails 408 and guide blocks 407 may transfer vertical forces of a load from the wheel 409 to the mounts 410, 406, and 405, to the sled 411, to the rails 408, and to the fork 401.

Figure 4F:
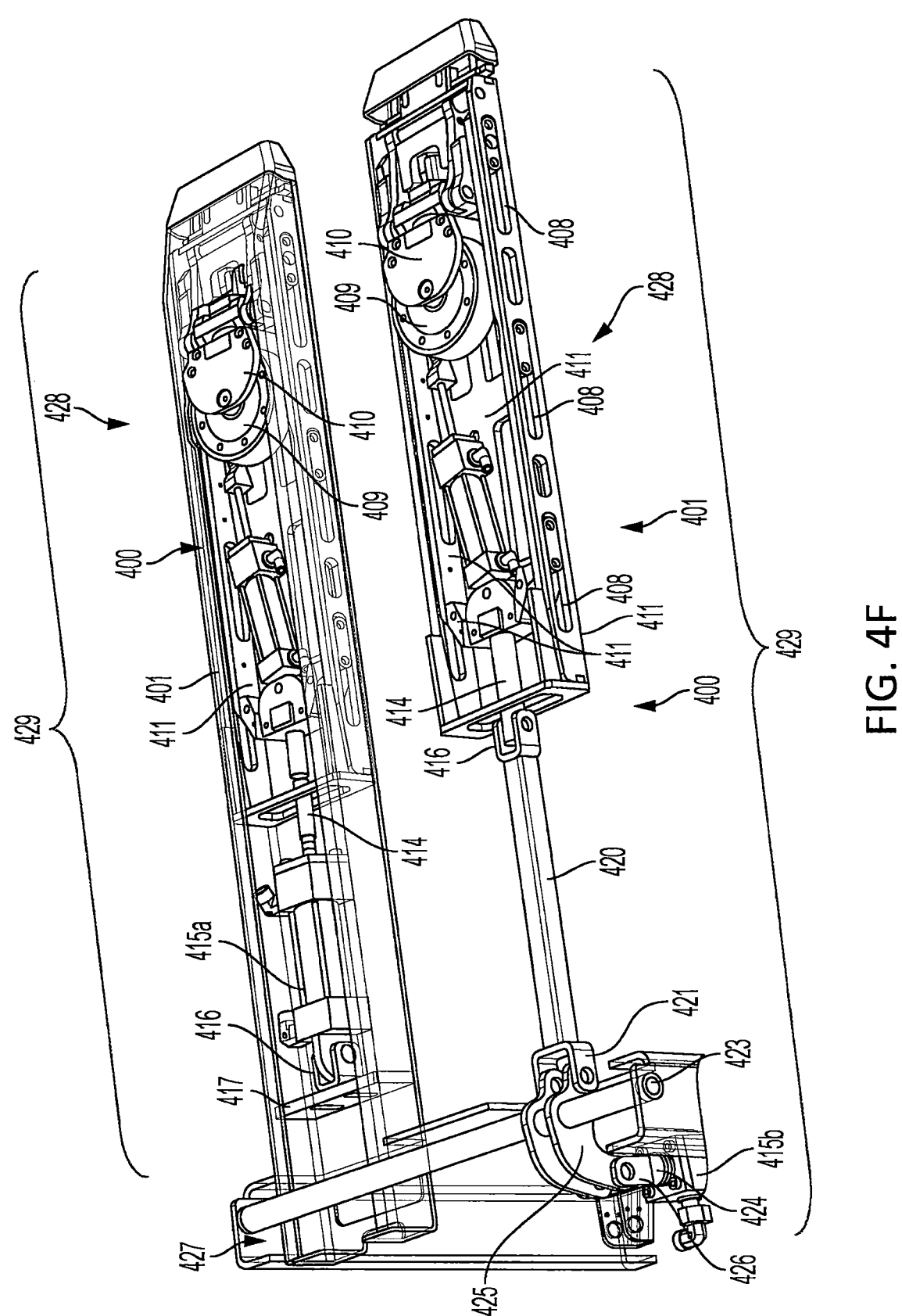
FIG. 4F illustrates example forks and the example NLS support wheel systems in a nested state with each fork depicting alternative equivalent means of reorienting the support wheel, either using the same push rod that does the lifting of the forks or using a separate actuator.
Figure 4G:
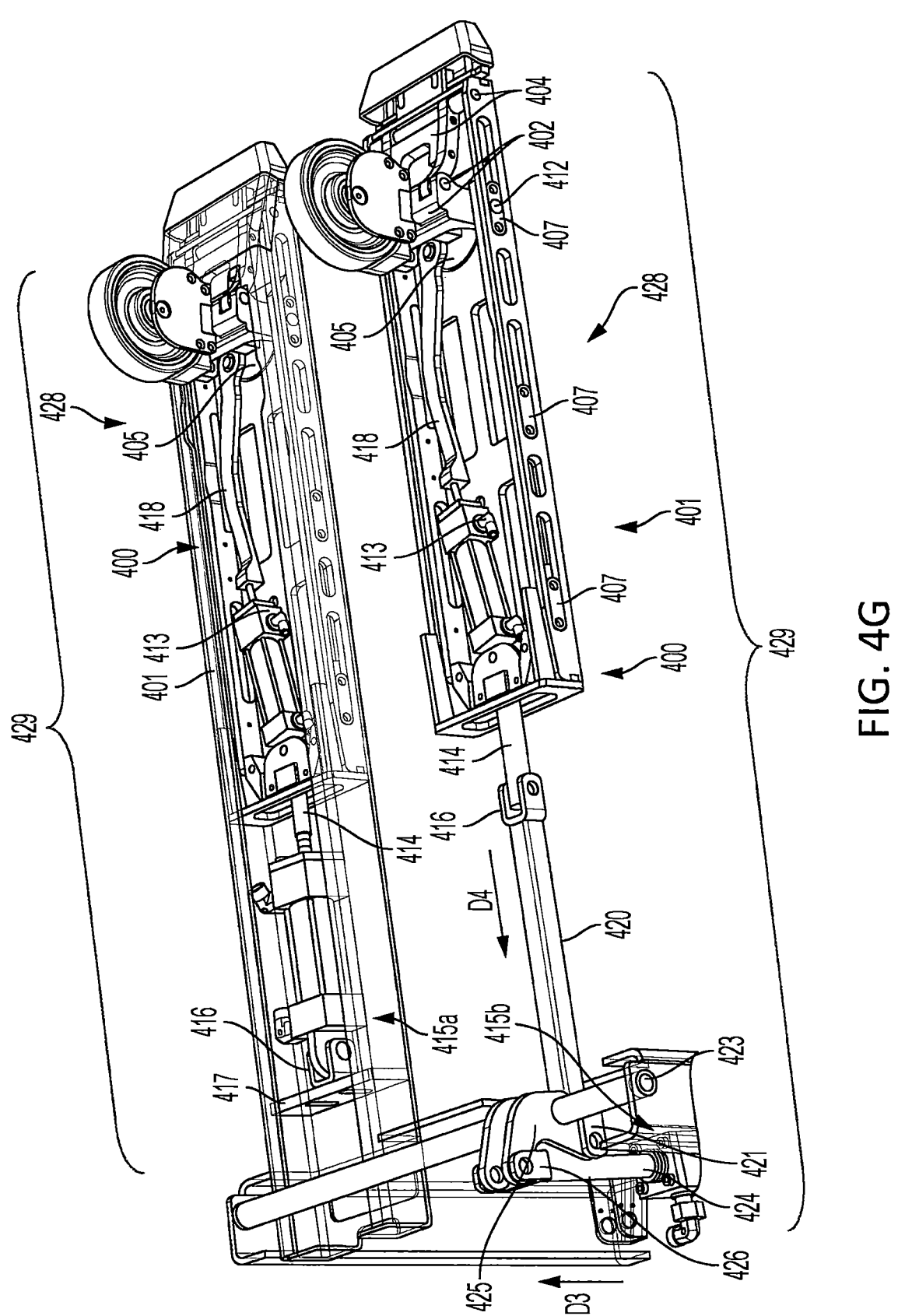
FIG. 4G illustrates example forks and the example NLS support wheel systems in a deployed state, again with each fork showing alternative means of effecting the wheel reorientation.

In one or more cases, as an alternative to the actuator 415*a* being mounted in the fork 401, an actuator may be vertically mounted within the A-frame of the machine (e.g., A-frame 304 of machine 300). For example, as illustrated in FIGS. 4F and 4G, the actuator 415*b* may be vertically positioned within the A-frame 427. The actuator 415*b* may be coupled to the rod 414 via linkages 420 and 425. The linkages 420 and 425 are configured to transfer a force generated by a motion of rod 424 of the actuator 415*b* to the rod 414. The linkage 420 may be a longitudinal member having a first end 416 and a second end 421. The linkage 420 is configured to axially translate along the length L of the fork 401, such that the wheel 409 may transition between a nested state and a deployed state. The first end 416 of the linkage 420 may be pivotably coupled to the rod 414. The second end 421 may be pivotably coupled with an end of the linkage 425. In some cases, a rod 423 is positioned through the linkage 425 fixed to the A-frame 427. An opposing end of the linkage 425 is pivotably coupled to an end 426 of rod 424.

To transition the wheel 409 from a nested state to a deployed state, actuator 415*b* may push rod 424 in direction D3. As the rod 424 moves in direction D3, the linkage 425 pivots about rod 423 causing linkage 420, and in turn rod 414, to move in direction D4. To transition the wheel 409 from the deployed state to the nested state, the actuator 415*b* may pull rod 424 in a direction opposite direction D3 thereby pivoting linkage 425 about rod 423. As such, linkage 420 and rod 414 move in a direction opposite direction D4, thereby causing the wheel 409 to transition from the deployed state to the nested state. In some cases, the vertical actuator system may provide a pushing/pulling force to the rod 414 with an approximate 2:1 mechanical advantage.

Figures 4H, 4I:
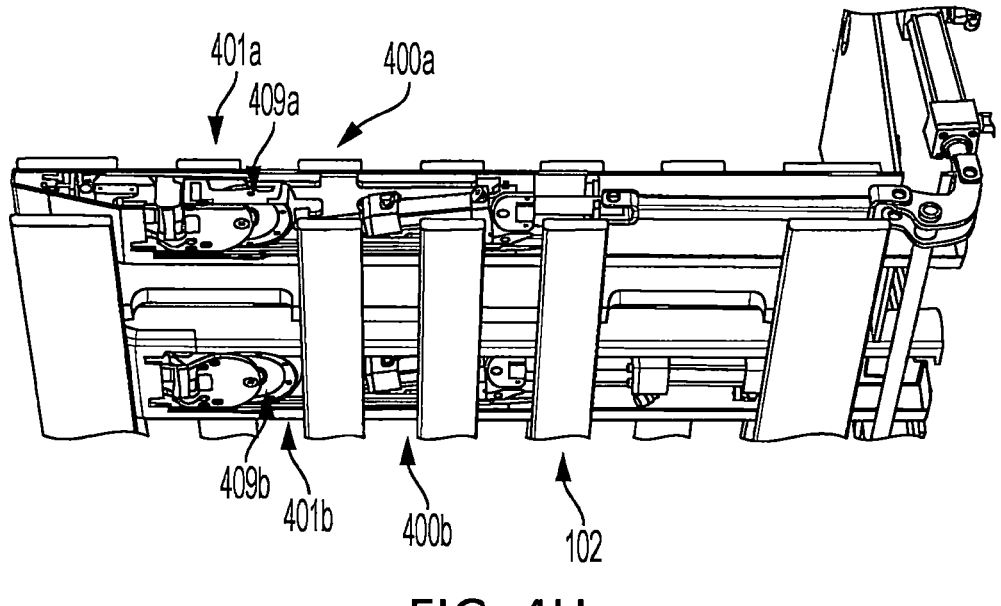
FIGS. 4H-4K illustrate the example forks and example NLS support wheel systems transitioning from a nested state to a deployed state within a pallet and then in the case of FIG. 4K, steering in a crab motion to move laterally while also moving straight.
Figures 4J, 4K:
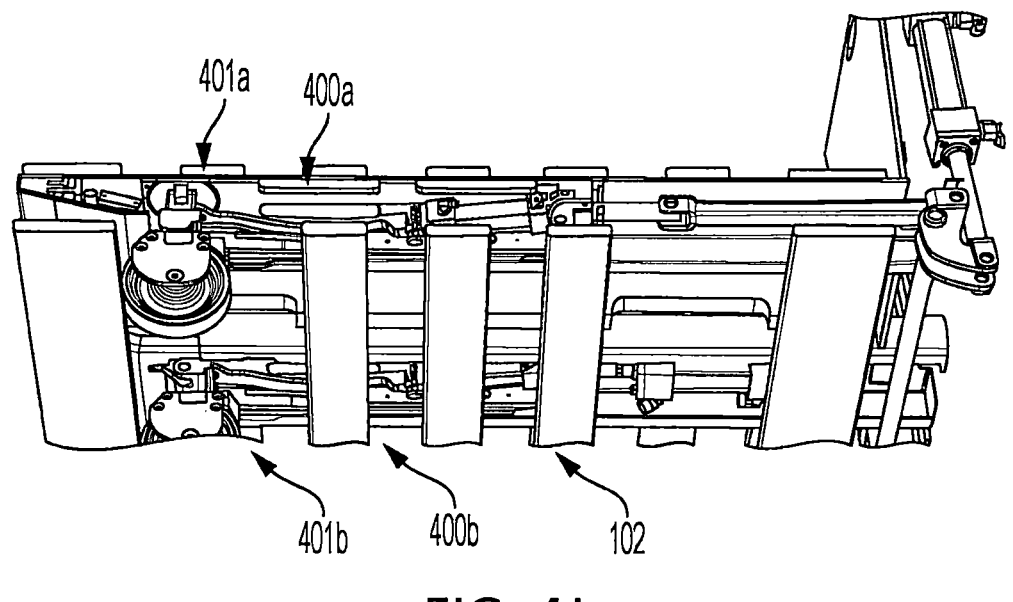

In one or more cases, to transition the wheel 409 between deployed and nested states, the machine 300 may utilize horizontal actuator systems (such as actuator 415*a* and its associated components) in each fork (e.g., fork 401*b* illustrated in FIG. 4H). In one or more other cases, the machine 300 may utilize vertical actuator systems (such as actuator 415*b* and its associated components) in each fork (e.g., fork 401*a* illustrated in FIG. 4H). In yet one or more other cases, the machine 300 may utilize a horizontal actuator system in one fork, and a vertical actuator system in the other fork, as illustrated in FIGS. 4F-4K. FIGS. 4H-4K illustrate forks 401*a*, 401*b*, and the systems 400*a*, 400*b* transitioning from a nested state to a deployed state within the pallet 102. Forks 401*a*, 401*b* include the same or similar features as fork 401. Systems 400*a*, 400*b* include the same or similar features as system 400. Wheels 409*a*, 409*b* include the same or similar features as wheels 409. The systems 400*a*, 400*b* may each utilize wheels 409. The wheels 409*a*, 409*b* may have a diameter of about 150 mm. The wheels 409*a*, 409*b* may be used as the lifting/lowering member to raise/lower the respective forks 401*a*, 401*b*. Once fully lifted, the wheels 409*a*, 409*b* may be steered, via the respective steering assemblies, to various orientations based on a direction of travel, such as straight-running, lateral, rotate-about-center, or all-wheel steering. FIG. 4H illustrates the wheels 409*a*, 409*b* fully nested within the respective forks 401*a*, 401*b*. The systems 400*a*, 400*b*, and in particular the sleds of each system 400*a*, 400*b* may be fully retracted in the nested configuration. When transitioning from the nested configuration to the deployed configuration, the wheels 409*a*, 409*b* may begin to be angled downward such that the edge of each wheel 409*a*, 409*b* engages the surface of a floor. For example, the wheels 409*a*, 409*b* may be angled down by about 15 mm. When the wheels 409*a*, 409*b* engages the floor, the forks 401*a*, 401*b* may engage the underside of the upper deck boards of the pallet 102 and lift the pallet 102 from the ground. FIG. 4I illustrates the wheels 409*a*, 409*b* may be fully lowered, and in turn, the forks 401*a*, 401*b* being fully raised. The wheels 409*a*, 409*b* may be steered (e.g., by retracting the actuator 413 of the steering assembly 428) into a lateral running orientation, as illustrated in FIG. 4I. FIG. 4J illustrates the wheels 409*a*, 409*b* being oriented in a straight running orientation (e.g., by further retracting the actuator 413 of the steering assembly 428). FIG. 4K illustrates a maximum rotation of the wheels 409*a*, 409*b* oriented for all-wheel steering (e.g., by fully extending steering arm 418 of the steering assembly 428).

Figure 5A:
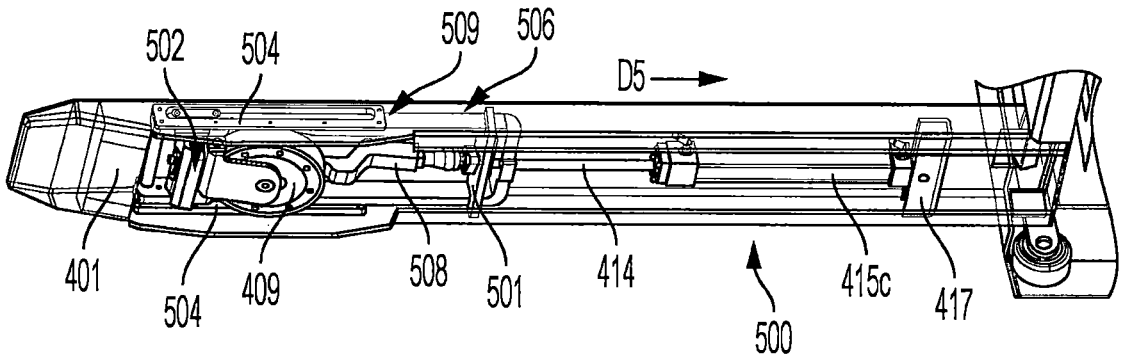
FIGS. 5A-5C illustrate a bottom isometric view of another example fork and example NLS support wheel system transitioning between a nested state and a deployed state.
Figure 5B:
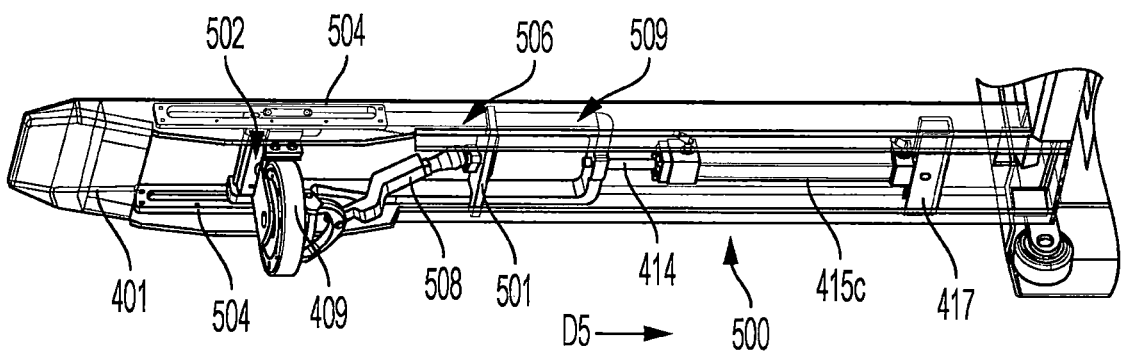
Figure 5C:
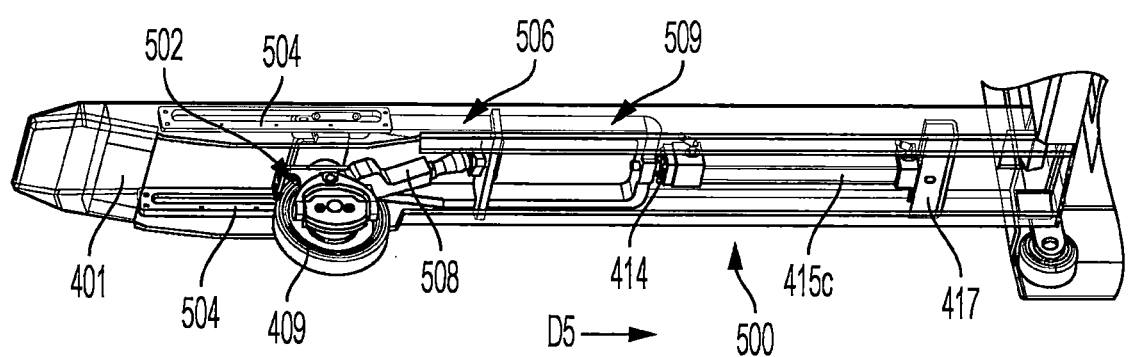

FIGS. 5A-5C illustrate a bottom isometric view of fork 401 and another NLS support wheel system 500 (hereinafter "system 500") transitioning between a nested state and a deployed state. System 500 includes one or more of the same or similar features as system 400, and a description of such features is not repeated. System 500 is distinguishable from system 400 in that system 500 utilizes one actuator 415*c* and a pivot and rotation assembly 506 to transition the wheel 409 between nested and deployed states and rotate the wheel 409 in a direction of travel (e.g., a straight direction of travel). It is noted that the system 500 may be utilized in each fork 306*a*, 306*b* of machine 300 in the same or similar manner as systems 308*a*, 308*b*.

In one or more cases, the actuator 415*c* is configured to push and pull the rotation assembly 506 to transition the wheel 409 between nested and deployed states as well as orient the wheel 409 in the direction of travel. The rotation assembly 506 includes a bracket 509 that is configured to translate between rails 504 that are fixed to fork 401 and along the length of the fork 401. A proximal end of the bracket 509 is coupled to rod 414 of the actuator 415*c*. A distal end of the bracket 509 is configured to translate between rails 504 and includes a wheel mount 502 that is configured to move the wheel 409 between a nested state and a deployed state based on the direction of translation of the bracket 509. The wheel 409 is rotatably and pivotably coupled to the wheel mount 502 and a pivot and rotation arm 508 at the end of the arm 508. An opposite end of the arm 508 is pivotably coupled to a mount 501 that is fixed to the fork 401. In one or more cases, the arm 508 includes through holes sized to allow one or more portions of the bracket 509 translate therethrough, thereby guiding the translation of the bracket 509.

As the actuator 415*c* pulls the bracket 509 in a direction D5 via the rod 414, the wheel rotation bracket 502 translates in direction D5 pressing a portion of the wheel 409 against the arm 508. As the brackets 502 and 509 continue to move in direction D5, the fixed position of the arm 508 via the mount 501 causes the wheel 409 to move from a nested state to a deployed state, as illustrated in FIGS. 5A and 5B. At a certain length, the wheel 409 rotates about the arm 508 and is oriented from a lateral direction of travel to a straight direction of travel. In some cases, the wheel 409 may be rotated to be oriented for a rotate-about-center direction of travel. To transition the wheel 409 from the deployed state to a nested state, the actuator 415*c* drives the brackets 502 and 509 in a direction opposite direction D5.

FIGS. 6A-6E illustrate the fork 401 and another example NLS support wheel system 600 (hereinafter "system 600") transitioning between a nested state and a deployed state. System 600 includes one or more of the same or similar features as system 400, and a description of such features is not repeated. System 600 is distinguishable from system 400 in that system 600 utilizes an actuator 415*d* and a sled 602 having a rack 614 that are configured to transition the wheel 409 between nested and deployed states, as well as, to rotate the wheel 409 360 degrees while in a deployed state. It is noted that the system 600 may be utilized in each fork 306*a*, 306*b* of machine 300 in the same or similar manner as systems 308*a*, 308*b*.

The actuator 415*d* is fixed to a sled 602 that is configured to axially translate along a length of the fork 401. Rails 604 are disposed on opposing sides of the sled 602, in which portions of the sled 602 are configured to translate within slots of the rails 604, thereby guiding the sled 602 to translate within the fork 401. The rod 414 of the actuator is coupled with a cross bar 606 at an end of the rod 414. The cross bar 606 may be pivotably coupled to the end of each arm 608. The opposite end of each arm 608 may be pivotably coupled to a cross member 610. The wheel 409 may be coupled to the cross member 610 via a mount 616 that passes through the cross member 610 and is coupled to a rotatable gear 612. The gear 612 may be rotatably coupled to a mount 618 that is fixed to a portion of the fork 401. The rack 614 of the sled 602 may have teeth that interface with the gear 612, such that the gear 612 rotates as the teeth of the rack 614 translate along the teeth of the gear 612.

Figure 6A:
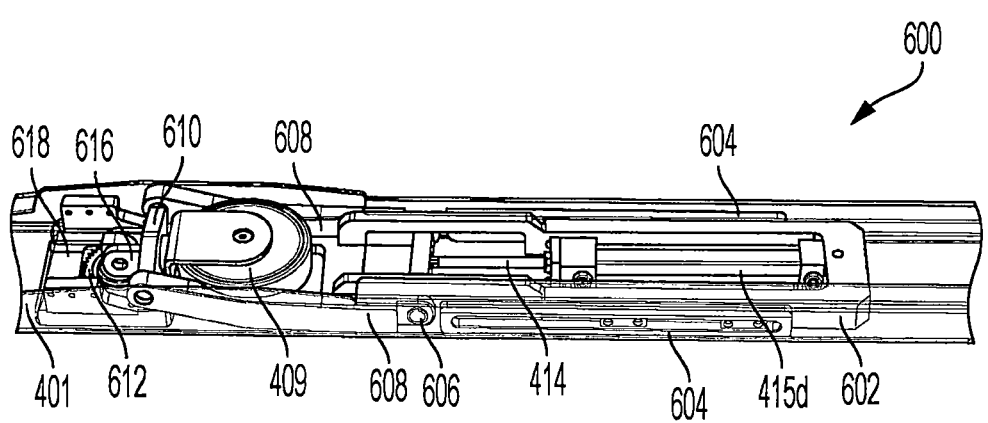
FIGS. 6A-6E illustrate another example fork and example NLS support wheel system transitioning between a nested state and a deployed state.
Figure 6B:
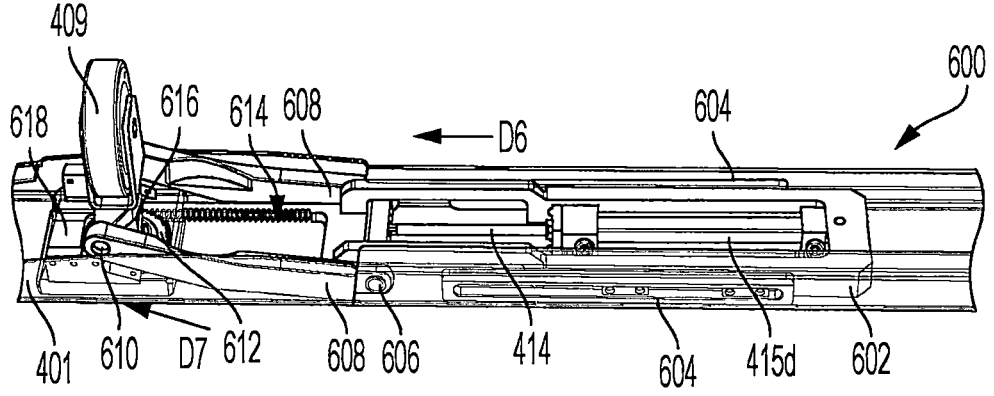
Figure 6C:
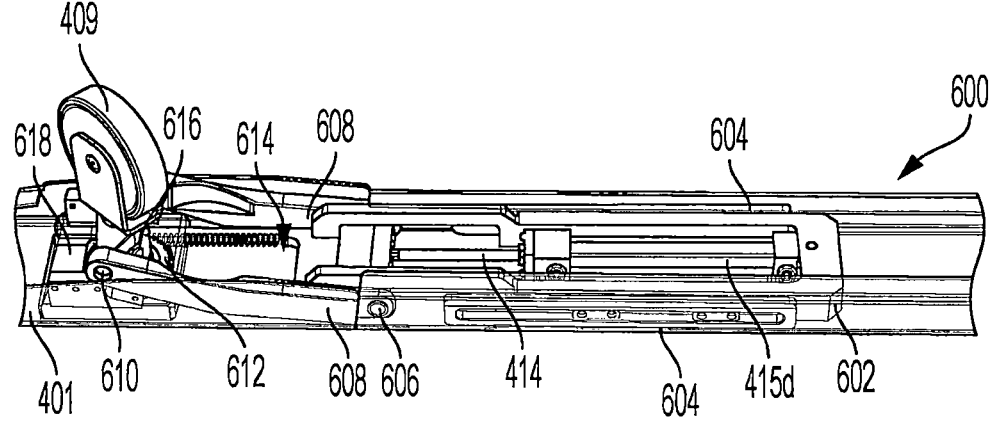
Figure 6D:
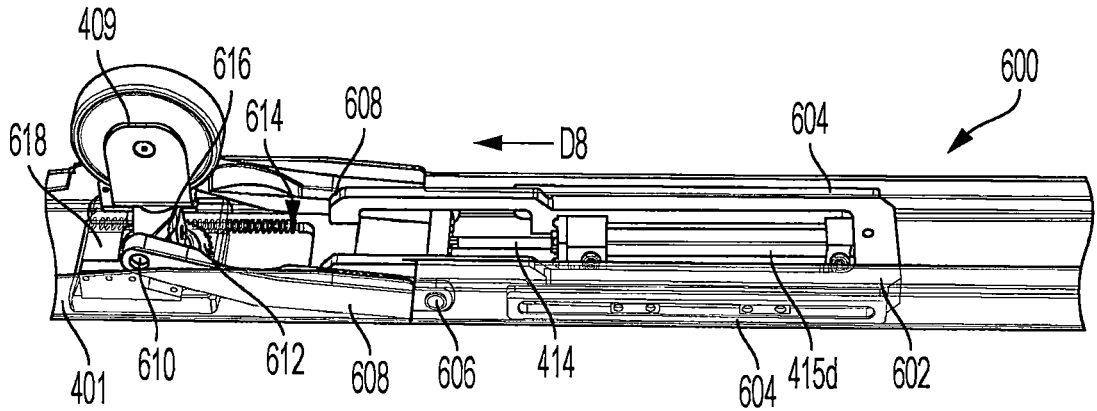
Figure 6E:
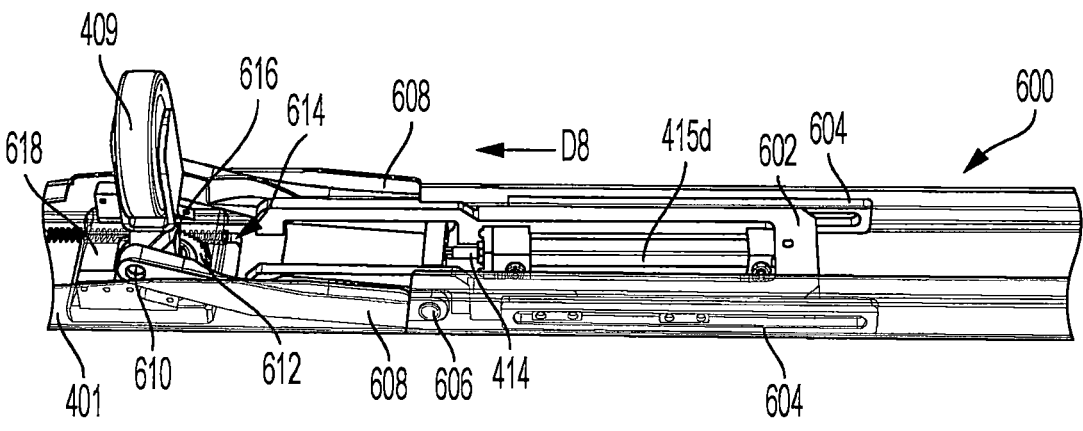

In one or more cases, to transition the system 600 from a nested state to a deployed state, the sled 602 is locked in position, as illustrated in FIG. 6A. As illustrated in FIG. 6B, the actuator 415*d* extends the rod 414 in direction D6 to move the cross bar 606 and arms 608 in direction D6. While traveling in direction D6, the ends of the arms 608 that are coupled to one another via cross member 610 contact a ramp of mount 618 causing the ends of arms 608 and cross member 610 to move in direction D7, thereby rotating the wheel 409 from a nested state to a deployed state, and in turn, lifting the fork 401. To orient the wheel 409 (e.g., steer the wheel 409), the cross bar 606 may be locked in position and the sled 602 may be unlocked from its position. While the cross bar 606 is locked in position, the actuator 415*d* may retract the rod 414 causing the sled 602 to move in direction D8, as illustrated in FIGS. 6D and 6E. As the sled 602 moves in direction D8, the rack 614 of the sled 602 rotates the gear 612 and thereby rotates the wheel 409 about its central axis. As such, the direction of travel (i.e., the orientation) of the wheel 409 may change based on the distance and/or direction that the rack 614 moves within the fork 401. For example, FIG. 6D illustrates the wheel 409 being oriented for a straight direction of travel, and FIG. 6E illustrates the wheel 409 being oriented for a lateral direction of travel. To transition the system 600 from a deployed state to a nested state, the wheel 409 may be rotated to a lateral travel position while the cross bar 606 remains locked in place. Once the wheel 409 is laterally aligned with the fork 401, the cross bar 606 may be unlocked from its position, and the sled 602 may be locked in position. The actuator 415*d* may then retract the rod 414 in a direction opposite direction D6 causing the arms 608 to rotate the wheel 409 downwards into a nested position within the fork 401.

Figures 7A, 7B:
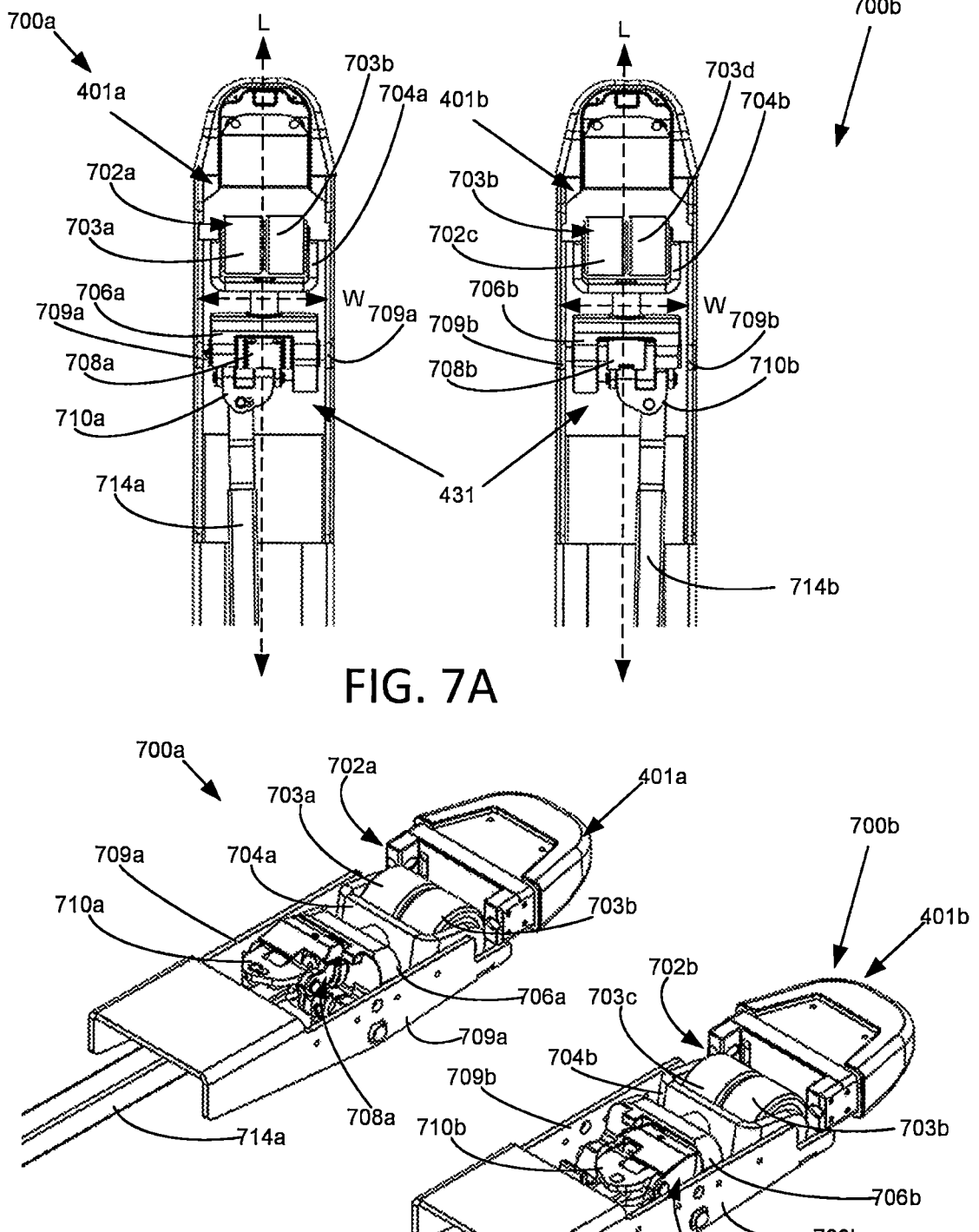
FIG. 7A illustrates a bottom view of an example NLS support wheel system in a nested state.
FIG. 7B illustrates an isometric top view of the example NLS support wheel system in the nested state.
Figures 7C, 7D:
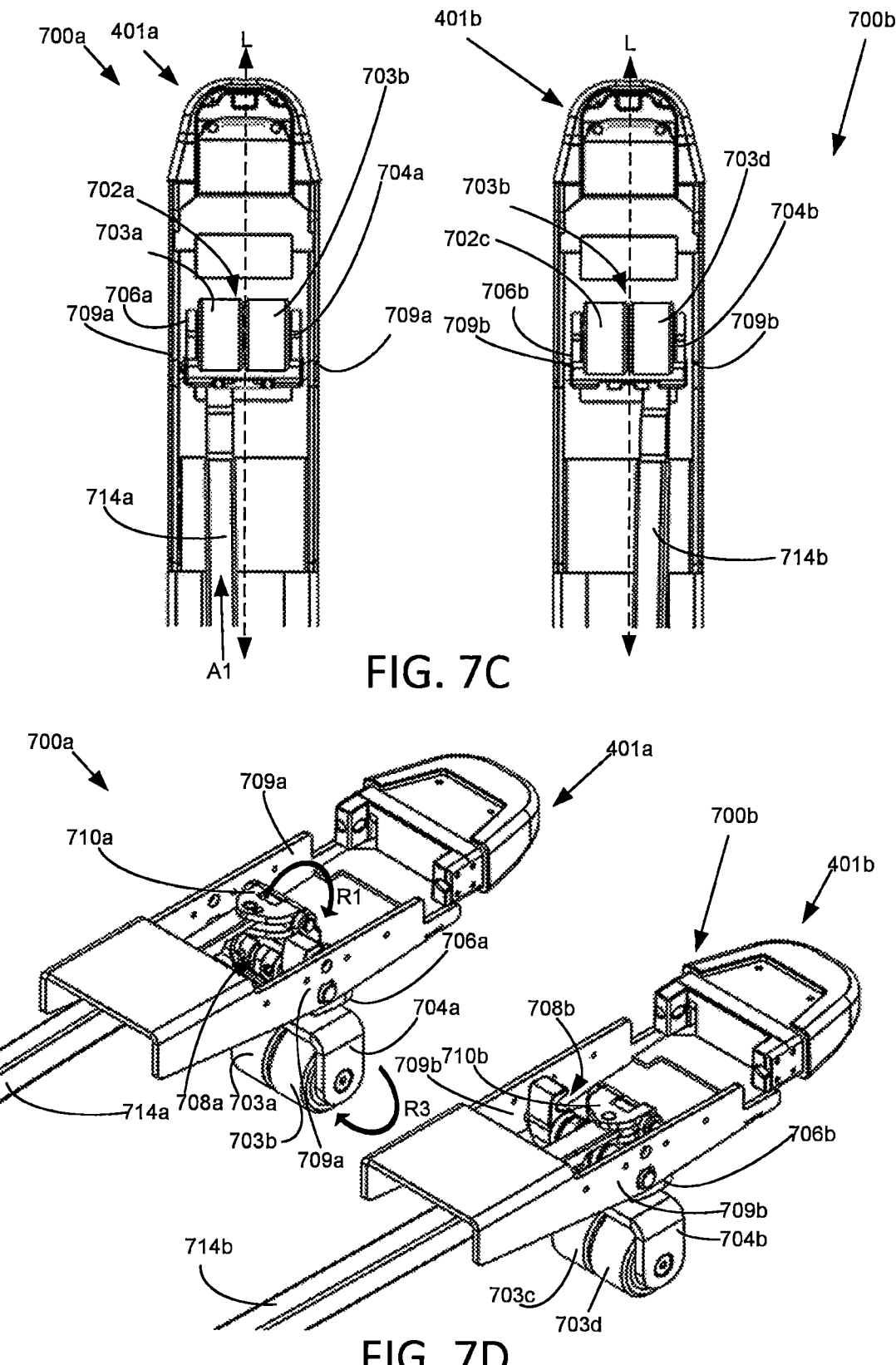
FIG. 7C illustrates a bottom view of the example NLS support wheel system in a deployed state.
FIG. 7D illustrates an isometric top view of the example NLS support wheel system in a deployed state.
Figure 7E:
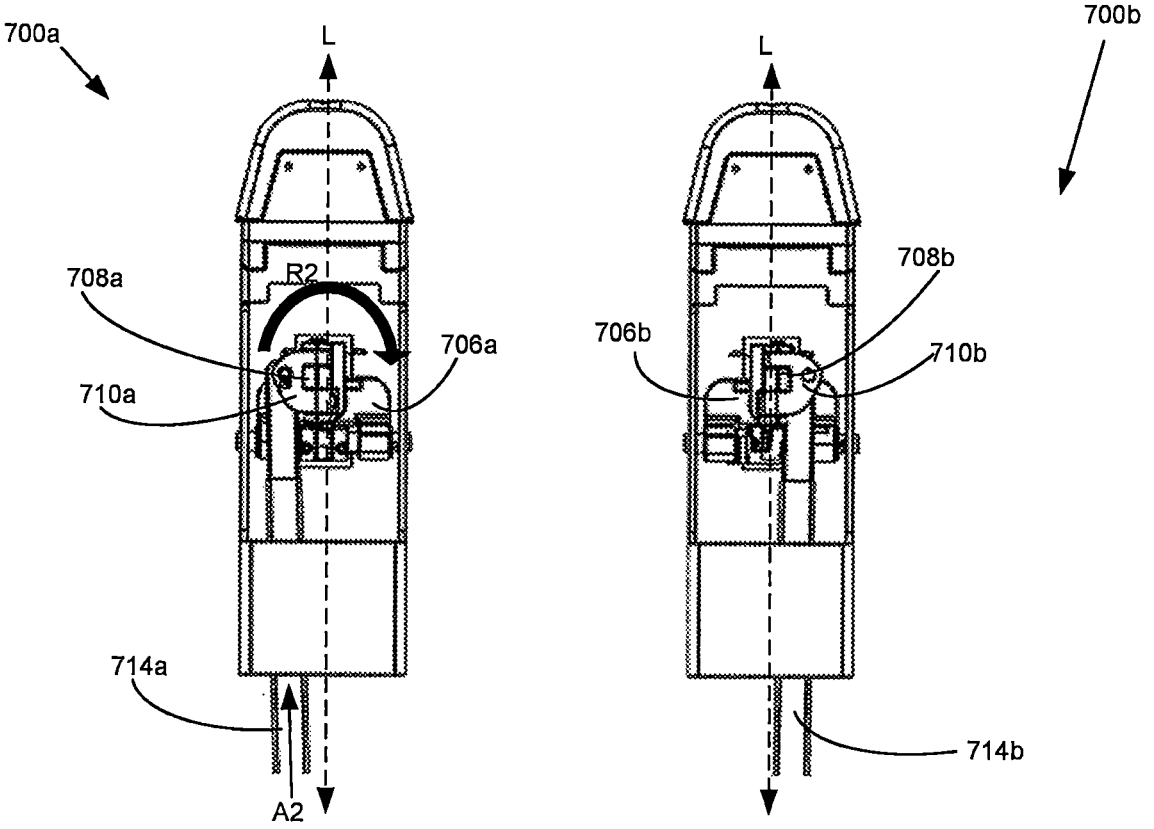
FIG. 7E illustrates a top view of the example NLS support wheel system in which the wheels are rotated 90 degrees while in a deployed state, being oriented for lateral travel.
Figure 7F:
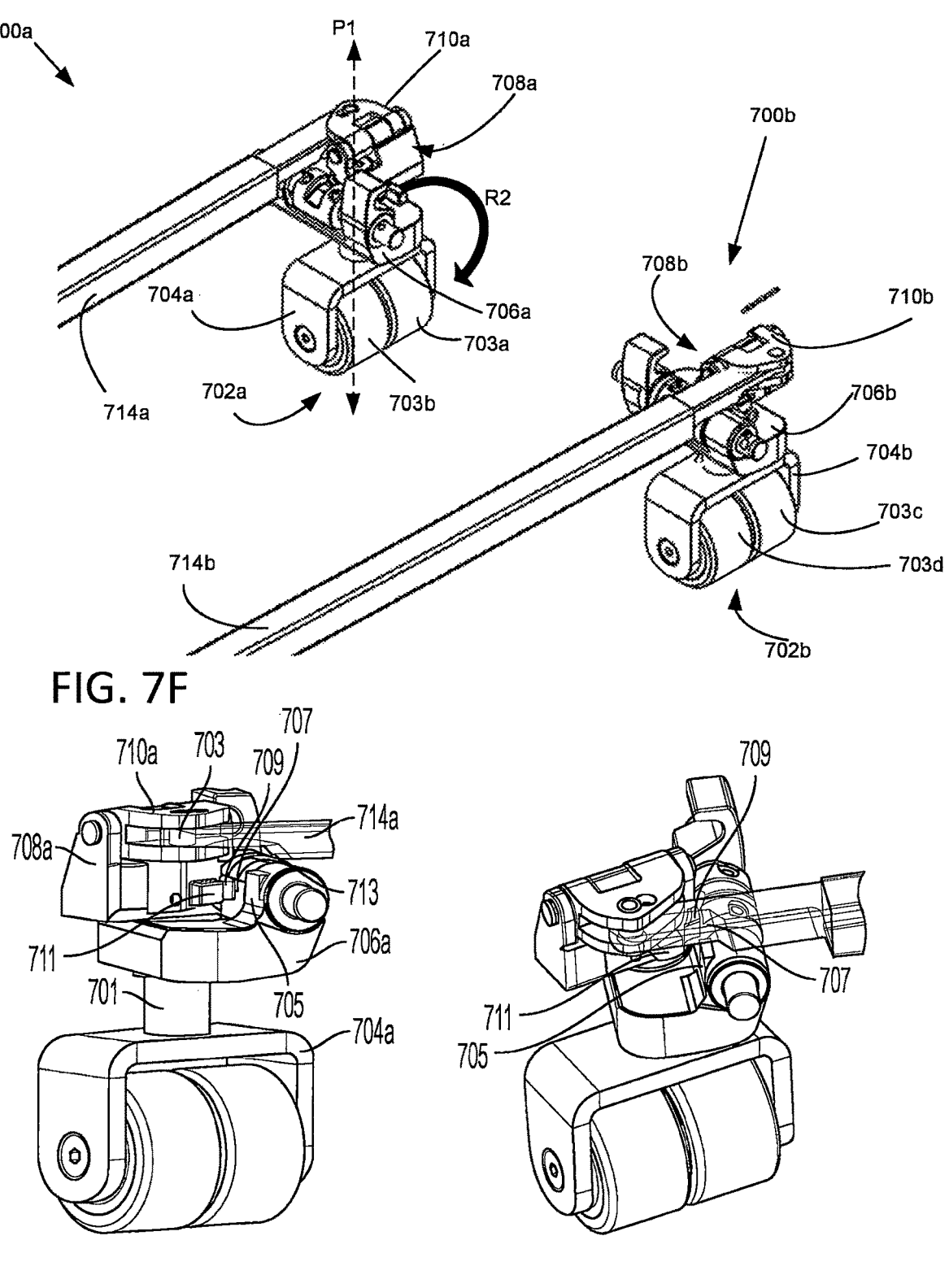
FIG. 7F illustrates an isometric top view of a portion of the example NLS support wheel system in which the wheels are rotated 90 degrees while in the deployed state, being oriented for lateral travel.

FIG. 7A illustrates a bottom view of an example NLS support wheel system 700 (hereinafter "system 700") in a nested state. FIG. 7B illustrates an isometric top view of the system 700 in the nested state. FIG. 7C illustrates a bottom view of the system 700 in a deployed state. FIG. 7D illustrates an isometric top view of the system 700 in the deployed state. FIG. 7E illustrates a top view of the system 700 in which the wheels 702*a*, 702*b* are rotated while in a deployed state. FIG. 7F illustrates an isometric top view of a portion of the system 700 in which the wheels 702*a*, 702*b* are rotated while in the deployed state. It is noted that system 700 may be utilized by machine 300 in the same or similar manner as systems 308*a*, 308*b*. One or more portions of system 700 (e.g., system 700*a* and system 700*b*) may be configured to translate within a cavity 431 of a respective fork (e.g., fork 401*a* and 401*b*) to transition the system 700 between nested and deployed states. In one or more cases, a wheel, such as wheel 702*a*, of a system, such as system 700*a*, may have a diameter of about 75 mm. In some cases, the wheel may be formed of two wheels that are each configured to rotate in the same direction or in opposite directions from one another. For example, wheel 702*a* may include wheels 703*a* and 703*b*, and wheel 702*b* may include wheels 703*c* and 703*d*. In other cases, the wheel may be a singular wheel, such as wheel 802 of system 800. In a nested state, the wheels 702*a*, 702*b* may be oriented such that the surface of each wheels 702*a*, 702*b* that contacts the ground is arranged with the length L of the respective forks 401*a*, 401*b*. As such, when the wheels 702*a*, 702*b* are oriented in a nested state, the wheels 702*a*, 702*b* may fit within a cavity of a pallet, such as pallet 102.

In a nested state, the wheels 702*a*, 702*b* are configured in a horizontal orientation such that the wheels 702*a*, 702*b* are nested entirely within the cavity 431 of the respective forks 401*a*, 401*b*, or such that a majority of each of the wheels 702*a*, 702*b* are nested within the cavity 431 of the respective forks 401*a*, 401*b*. As such, in the nested state, the wheels 702*a*, 702*b* (e.g., the surface of each of the wheels 702*a*, 702*b*) are positioned parallel or substantially parallel to the respective forks 401*a*, 401*b*. When transitioning the wheels 702*a*, 702*b* from a nested state to a deployed state, the wheels 702*a*, 702*b* may be used as lifting members to lift a pallet off the ground. In a deployed state, the wheels 702*a*, 702*b* are configured in a vertical orientation, such that each of the wheels 702*a*, 702*b* are oriented perpendicular or substantially perpendicular to the length L of the respective forks 401*a*, 401*b*. When transitioning the wheels 702*a*, 702*b* from a deployed state to a nested state, the wheels 702*a*, 702*b* may be used as lowering members to lower the pallet onto the ground.

The wheel 702*a* is operably coupled with a linkage member 714*a* such that the wheel 702*a* may transition between nested and deployed states as well as pivot to orient (e.g., steer) the heading of the wheel 702*a*. In one or more cases, the wheel 702*a* is operably coupled with the linkage member 714*a*, via wheel mount 704*a*, rotatable member 706*a*, pivot member 708*a*, and steering member 710*a*. While in the nested state, one or more of the wheel 702*a*, wheel mount 704*a*, rotatable member 706*a*, pivot member 708*a*, and steering member 710*a* may be positioned along the length L of the fork 401*a*, such that the wheel 702*a* is parallel with the fork 401*a*. While in the deployed state, one or more of the wheel 702*a*, wheel mount 704*a*, rotatable member 706*a*, and pivot member 708*a* may be positioned perpendicular or substantially perpendicular to the fork 401*a*.

The linkage 714*a* may be operably coupled to the rotatable member 706*a* via the steering member 710*a* to cause the wheel 702*a* to transition between nested and deployed states. For example, when transitioning from a nested state to a deployed state, the linkage 714*a* may translate within the fork 401 in direction A1, as illustrated in FIG. 7C, causing the steering member 710*a* to move towards a distal end of the fork 401*a*. As the steering member 710*a* moves towards a distal end of the fork 401*a*, the rotatable member 706*a* rotates about the steering member 710*a* in direction R1, as illustrated in FIG. 7D, and thereby rotating the wheel 702*a* from the nested state into the deployed state. In such cases, the wheels 702*a*, 702*b* are oriented in a straight direction of travel. In one or more cases, the rotatable member 706*a* may be centered along the width W of the fork 401*a* and fixed positionally along the length L of the fork 401*a*. Further, the rotatable member 706*a* is rotatably coupled to mounts 709*a* of the fork 401*a*. The mounts 709*a*, 709*b* may be disposed in the walls of the fork 401*a* on opposite sides of the rotatable member 706*a*. To allow the linkage 714*a* to translate in direction A1 while being coupled to the rotatable member 706*a* that is fixed positionally along the length L of the fork 401*a*, the linkage 714*a* may be arranged at an angle along the length L of the fork 401*a* that is not parallel to the length L of the fork 401*a*. As such, a proximal end of the linkage 714*a* and the steering member 710*a* may be coupled to one another at a position that is off-centered from the center of the fork 401*a* in the width W direction. That is, the proximal end of the linkage 714*a* and the steering member 710*a* may be coupled to one another on one side of the rotatable member 706*a* when viewed from a top view, as illustrated in FIG. 7A. To transition the wheel 702*a* from a deployed state to a nested state, the linkage 714*a* and steering member 710*a* may move in a direction opposite direction A1, thereby rotating the rotatable member 706*a* about the steering member 710*a* in a direction opposite direction R1.

The linkage 714*a* may be operably coupled with the pivot member 708*a* and wheel mount 704*a* via the steering member 710*a* to orient (e.g., steer) the heading of the wheel 702*a*. For example, to orient the wheel 702*a*, the linkage 714*a* may translate within the fork 401*a* in a direction A2, as illustrated in FIG. 7E, causing the wheel 702*a* to steer in direction R2 as illustrated in FIG. 7F. In some cases, the direction A1 and direction A2 may be the same direction. Direction A2 is distinguishable from direction A1 in that the linkage 714*a* translates within the fork 401*a* a farther distance than when translating in direction A1. In one or more cases, the steering member 710*a*, pivot member 708*a* and wheel mount 704*a* are coupled to one another such that the steering member 710*a*, pivot member 708*a* and wheel mount 704*a* may simultaneously pivot about axis PI of rotatable member 706*a* in direction R2 as the linkage 714*a* translates in direction A2. The steering member 710*a* is pivotably coupled to the proximal end of the linkage 714*a*. For example, as the linkage 714*a* moves in direction A2, the proximal end of the linkage 714*a* pushes the coupled end of the steering member 710*a* in direction A2 such that the coupled end of the steering member 710*a* pivots (e.g., orients) in direction R2 and in turn pivots the pivot member 708*a* and wheel mount 704*a* in direction R2. The linkage 714*a* may move in a direction opposite direction A2 to cause the steering member 710*a* to pivot in a direction opposite direction R2.

Figure 7G:
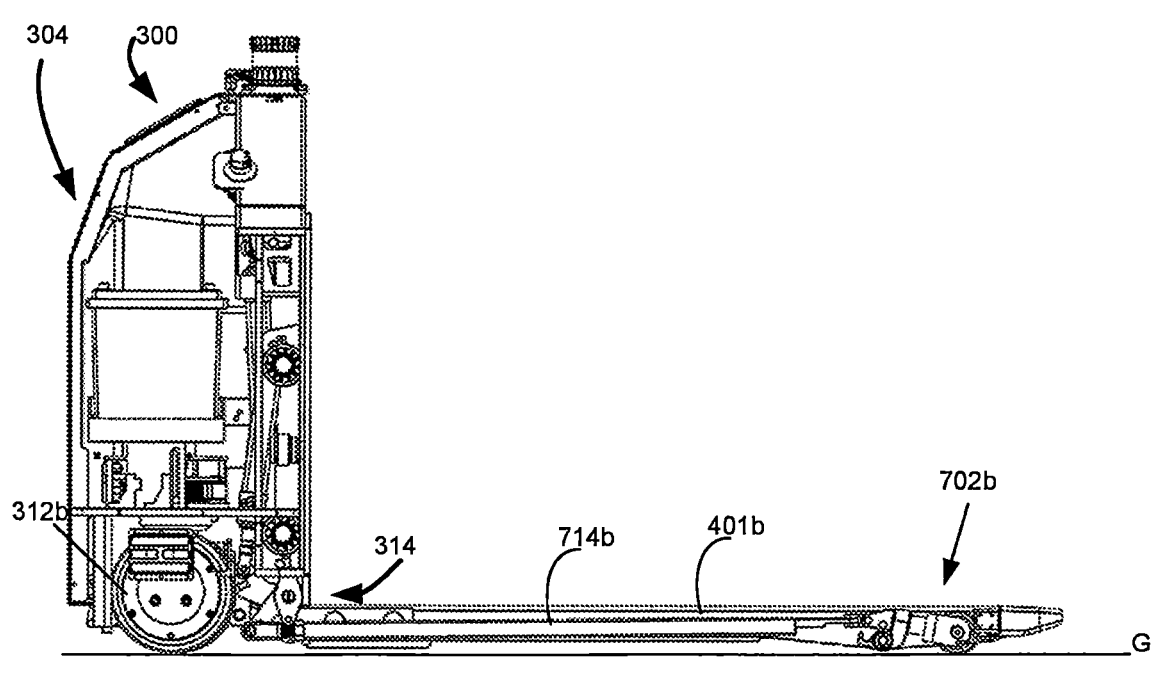
FIG. 7G illustrates a side view and FIG. 7H illustrates an end view of wheels of an example NLS support wheel system positioned to be in contact with the ground, so partially deployed, and example cantilevered wheels nested in an A-frame of an example pallet moving machine.
Figure 7H:
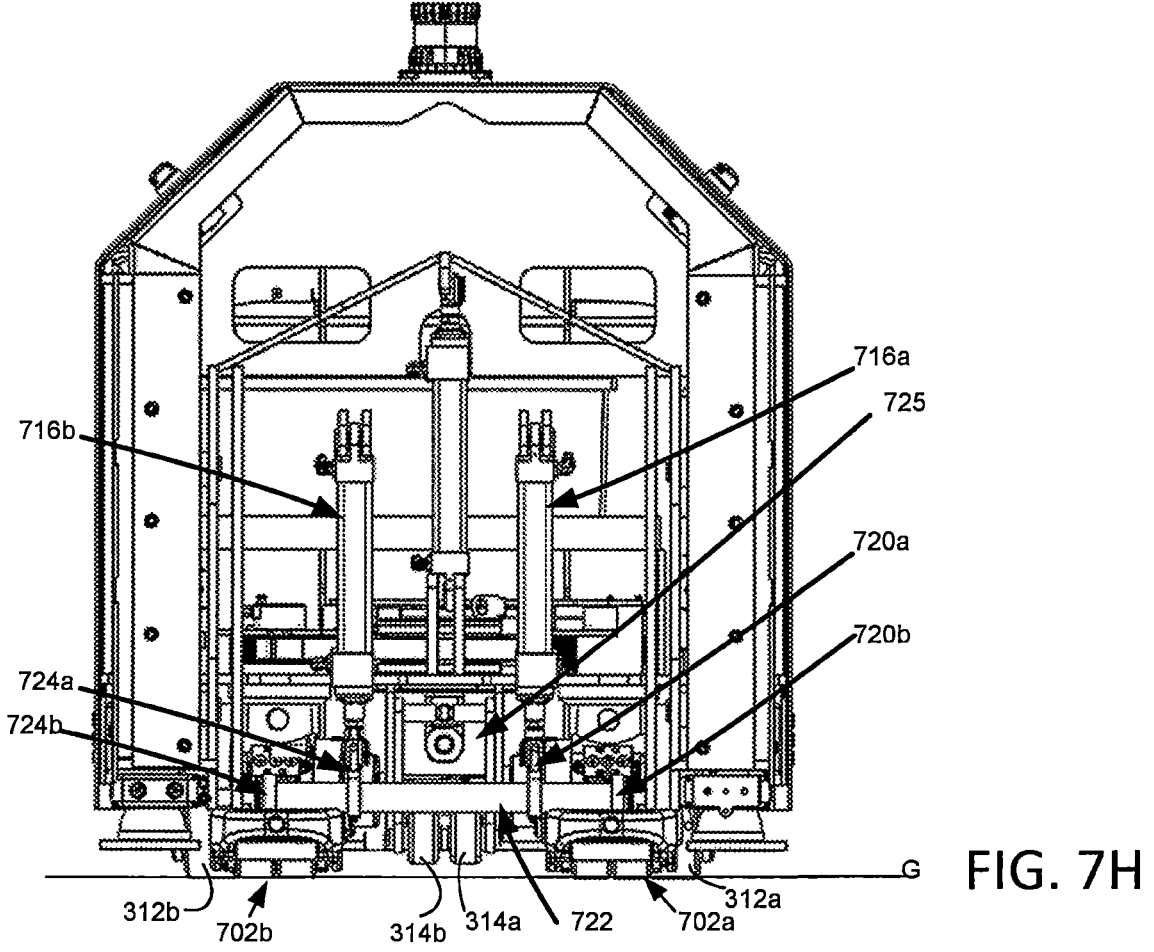
Figures 7I, 7J:
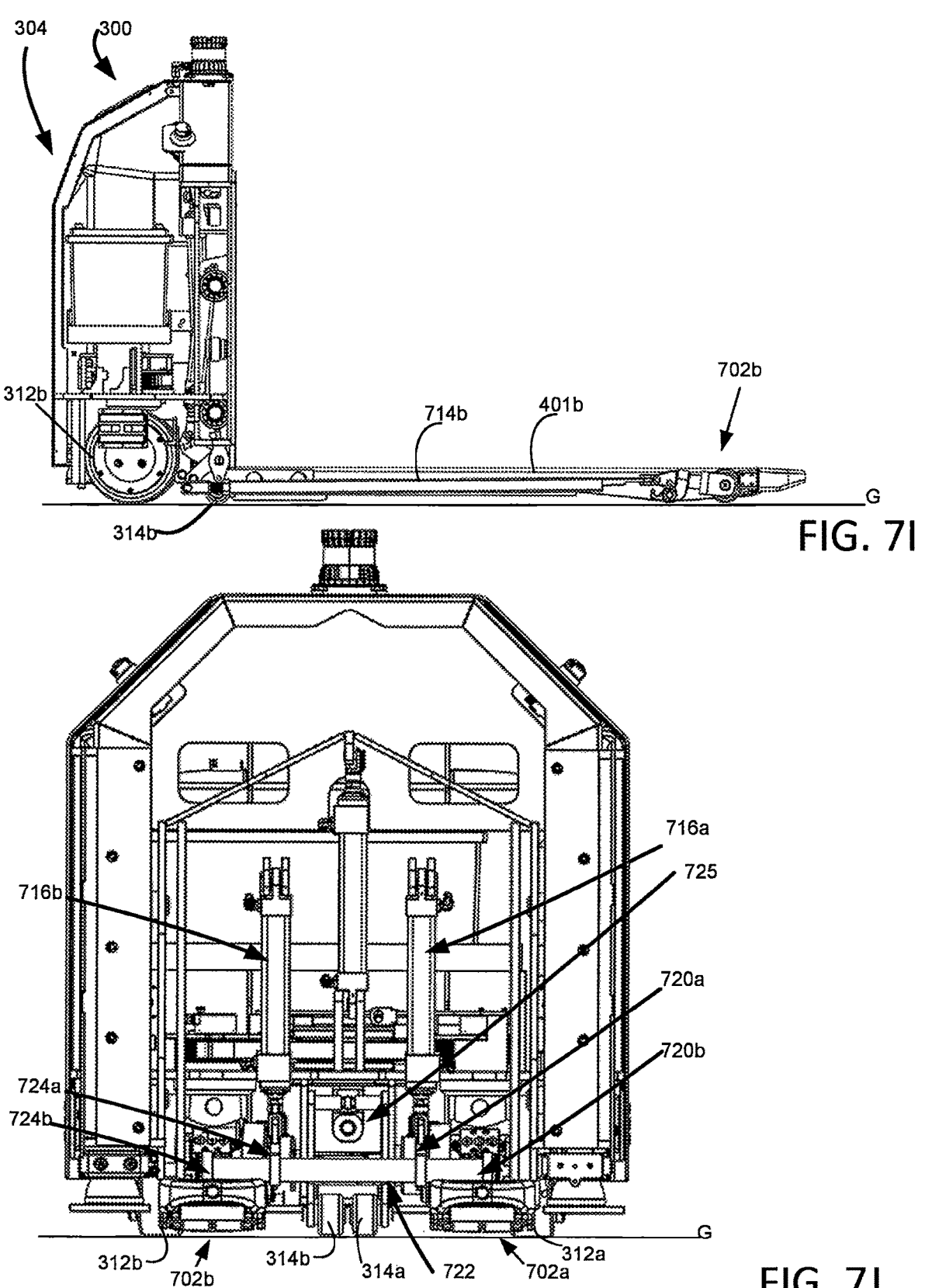
FIG. 7I illustrates a side view and FIG. 7J illustrates an end view of wheels of an example NLS support wheel system positioned in a nested state and example cantilevered wheels deployed from the A-frame of the example pallet moving machine, which suspends the forks with nested NLS support wheels above floor level.
Figures 1, 7K:
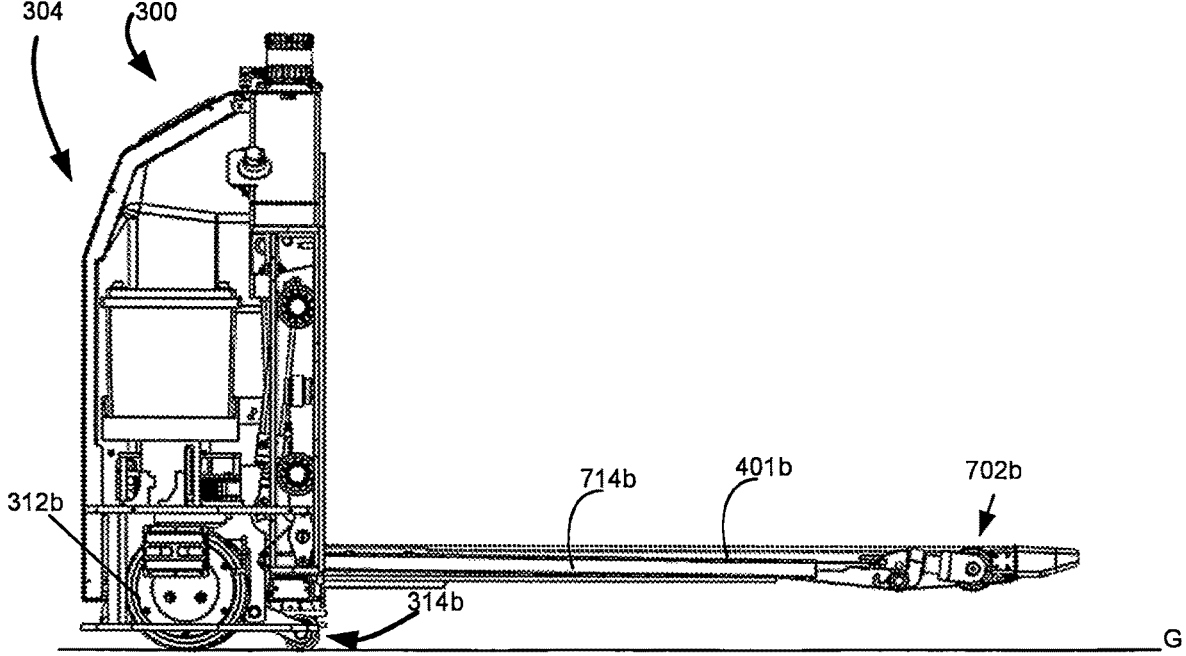
Figures 2A, 2B, 7K:
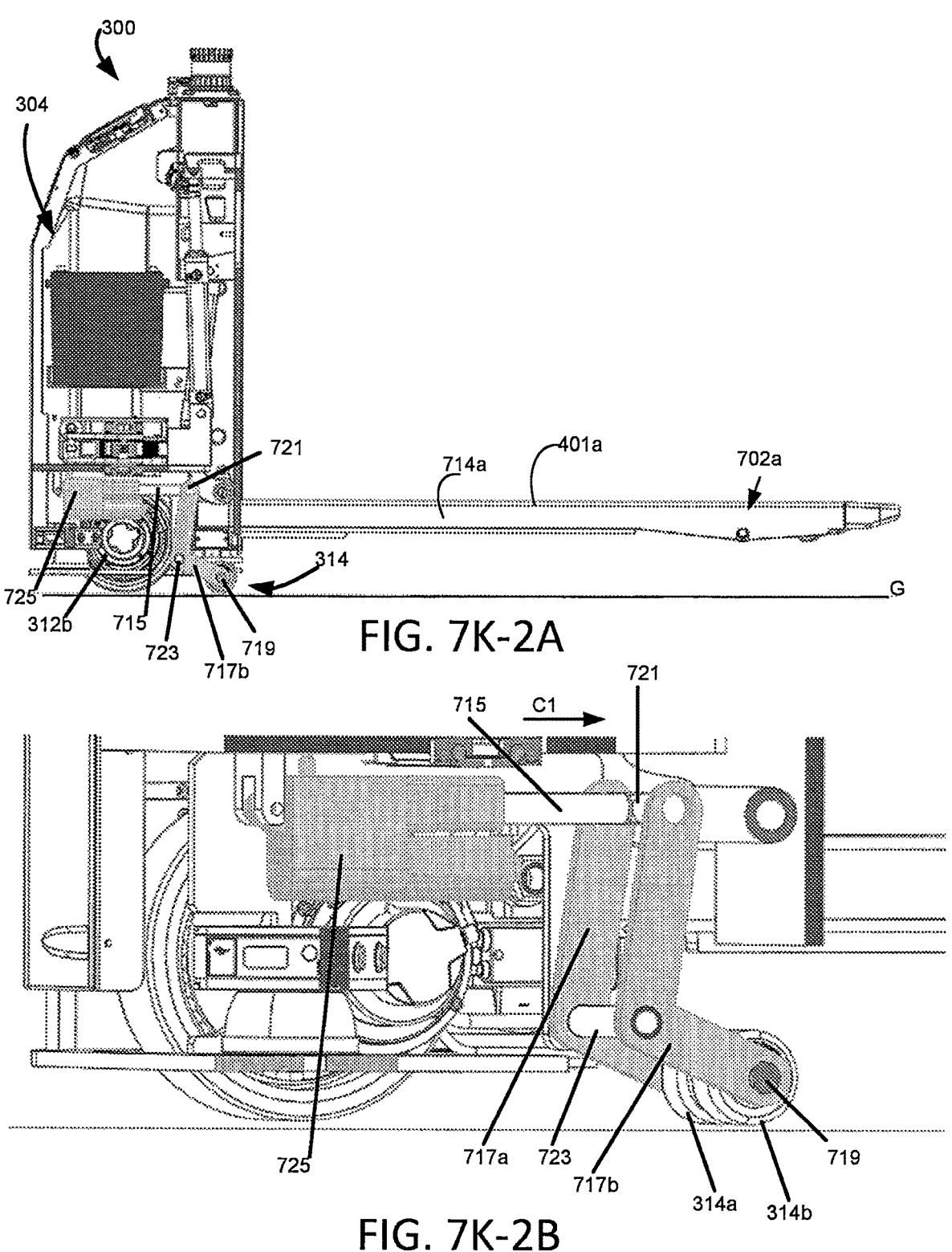

In one or more cases, as illustrated in FIGS. 7F-1 and 7F-2, pivot member 708*a* may include one or more guide blocks, such as guide blocks 709 and 711, to aide in defining the direction of travel of the wheel 702*a* as the linkage 714*a* translates either towards or away from the distal end of the fork causing the steering member 710*a* to rotate. For example, guide block 709 may constrain the position of the pivot member 708*a*, such that pivot member 708*a* does not pivot while the wheel 702*a* transitions from the nested state to the deployed state. In another example, guide block 711 may constrain the position of the rotatable member 706*a*, such that the rotatable member 706*a* does not rotate from a deployed state to a nested state while the wheel 702*a* is being oriented. In some cases, the guide blocks 709 and 711 are cast into the pivot member 708*a*. Guide block 711 may be configured to interface with a guide sleeve 713 positioned between rotatable member 706*a* to aide in lifting the fork 401*a* by constraining the pivot member 708*a* from rotating on a horizontal plane, thereby rotating the shaft 701 coupled to the wheel mount 704*a*. As the linkage 714*a* moves towards the distal end of the fork 401*a*, the rotatable member 706*a* rotates about the guide sleeve 713 into the deployed state to ensure that the rotatable member 706*a* is aligned within the fork 401*a*. As the rotatable member 706*a* is deployed, the distal end of the linkage 714*a* pushes the pin 703 of the steering member 710*a* and rotates about the pin 703 causing the pivot member 708*a* to rotate the guide block 711 from interfacing the guide sleeve 713 and to interface guide block 709 with the guide sleeve 713. The guide block 709 is now constrained against the guide sleeve 713 allowing the pivot member 708*a* to pivot further as the linkage 714*a* moves towards the distal end of the fork 401 (i.e., orient the direction of the wheel 702*a*.

Figure 7L:
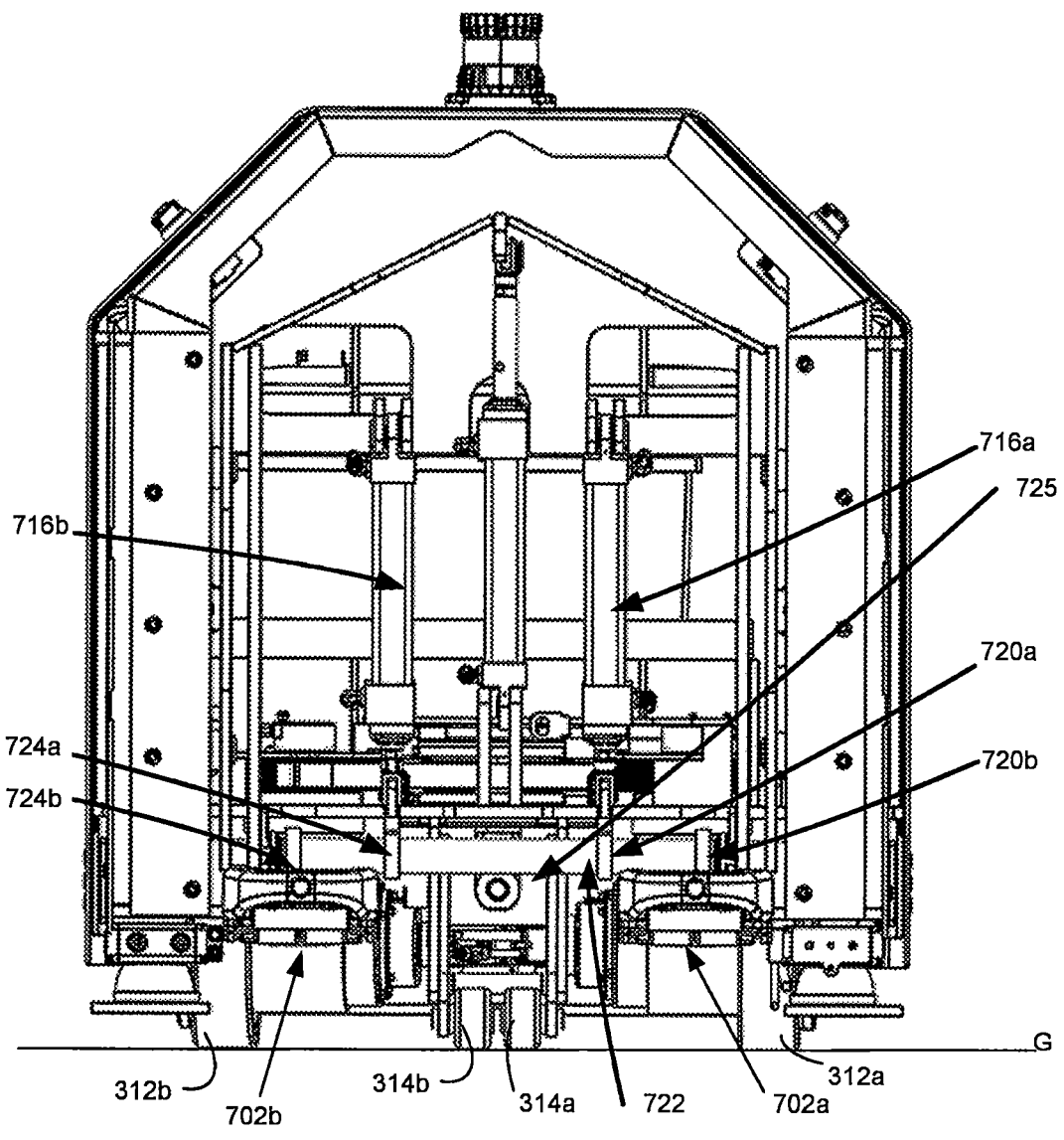
FIG. 7L illustrates an end view of an example NLS support wheel system positioned in a more elevated state and example cantilevered wheels deployed from the A-frame of the example pallet moving machine.
Figures 1, 7M:
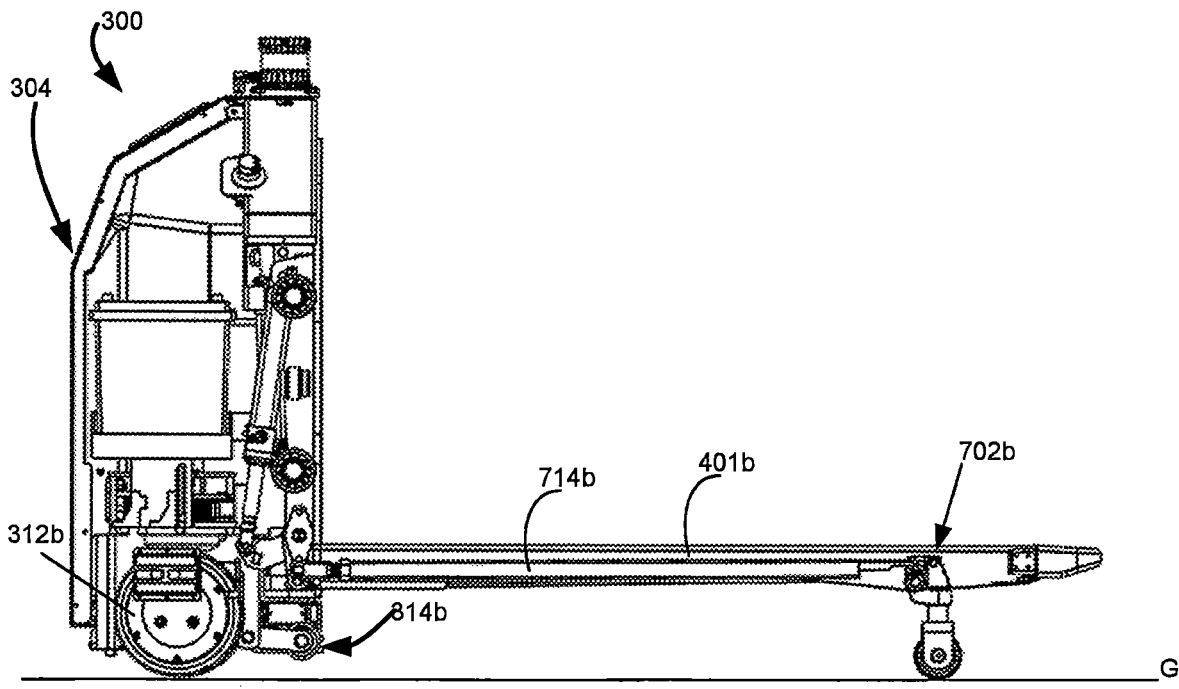
Figures 2A, 2B, 7M:
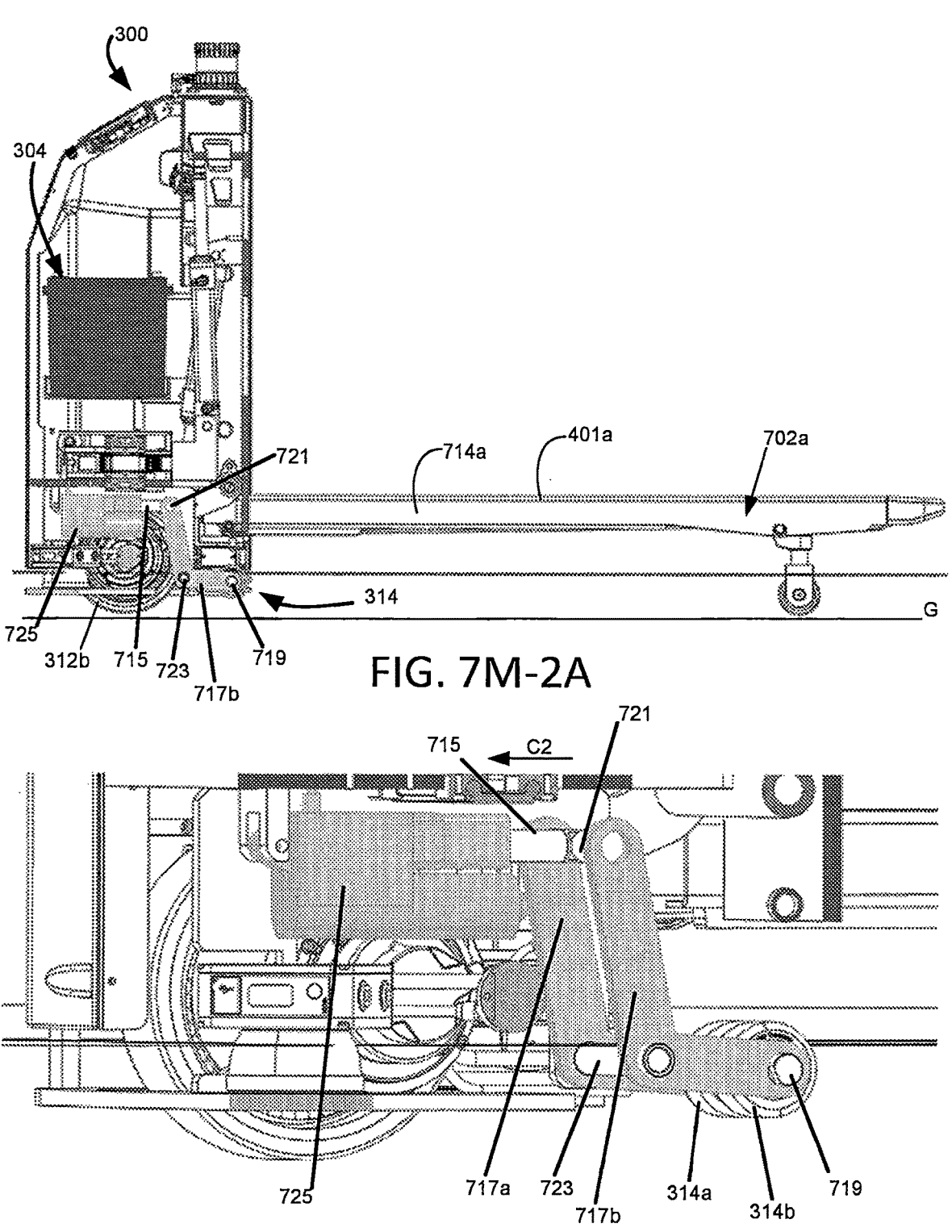

The wheel 702*a* may be rotatably coupled to the wheel mount 704*a*. For example, when traveling in a straight direction, as illustrated in FIG. 7D, the wheels, such as wheel 702*a*, may rotate about the wheel mount 704*a* in direction R3. Proximal ends of the wheel mount 704*a* may be disposed around and mounted both sides of wheel 702*a*. In one or more cases, wheels 703*a*, 703*b* of wheel 702*a* may be configured to rotate in the same direction or opposite directions from one another based on the direction of travel of the system 700*a* (and for example, system 300). For example, the wheels 702*a*, 702*b* may be oriented to rotate about the center of a system, such as system 300, as illustrated in FIGS. 3B and 7Q, or oriented to travel in a lateral direction, as illustrated in FIG. 7R or 7S.

To translate the linkage 714*a* within the fork 401*a*, at least one actuator may be operably coupled to the linkage 714*a* and push/retract the linkage 714*a* within the fork 401*a*. In one or more cases, actuators may be positioned within the A-frame 304 of the machine 300 as illustrated in FIG. 7H. In one or more other cases, actuators may be positioned within the forks, such as those described with respect to FIGS. 8A-8D. In yet other cases, some actuators may be positioned within the A-frame 304 while other actuators may be positioned within the forks, such as those described in FIGS. 4F and 4G. The actuator may be for example, but not limited to, a hydraulic actuator, an electric actuator, or the like.

As illustrated in FIG. 7H, actuators 716*a* and 716*b* may be vertically positioned within the A-frame 304. Actuators 716*a*, 716*b* may be operably coupled to linkages 714*a*, 714*b*, of systems 700*a*, 700*b*, respectively, and configured to push and/or retract the linkages 714*a*, 714*b* within the respective forks 401*a*, 401*b* to transition the systems 700*a*, 700*b* between nested and deployed states, as well as orient the heading of wheels 702*a*, 702*b*. To translate the vertical force generated by actuators 716*a*, 716*b* to a horizontal force that pushes and/or retracts the linkages 714*a*, 714*b*, the actuators 716*a*, 716*b* and linkages 714*a*, 714*b* may be rotatably coupled to one another via linkages 720*a*, 720*b*, 724*a*, 724*b* and shaft 722. For example, shaft 722 may be horizontally positioned across the A-frame 304. One end of linkage 720*a* may be rotatably coupled to the shaft 722, and an opposite end of linkage 720*a* may be rotatably coupled to a rod of the actuator 716*a* (whereas an opposite end of the actuator 716*a* is coupled to a portion of the A-frame 304). One end of linkage 720*b* may be rotatably coupled to the distal end of the linkage 714*a*, and an opposite end of linkage 720*b* may be rotatably coupled to the shaft 722. One end of linkage 724*a* may be rotatably coupled to the shaft 722, and an opposite end of linkage 724*a* may be rotatably coupled to a rod of the actuator 716*b* (whereas an opposite end of the actuator 716*b* is coupled to a portion of the A-frame 304). One end of linkage 724*b* may be rotatably coupled to the distal end of the linkage 714*b*, and an opposite end of linkage 724*b* may be rotatably coupled to the shaft 722.

Figure 7N:
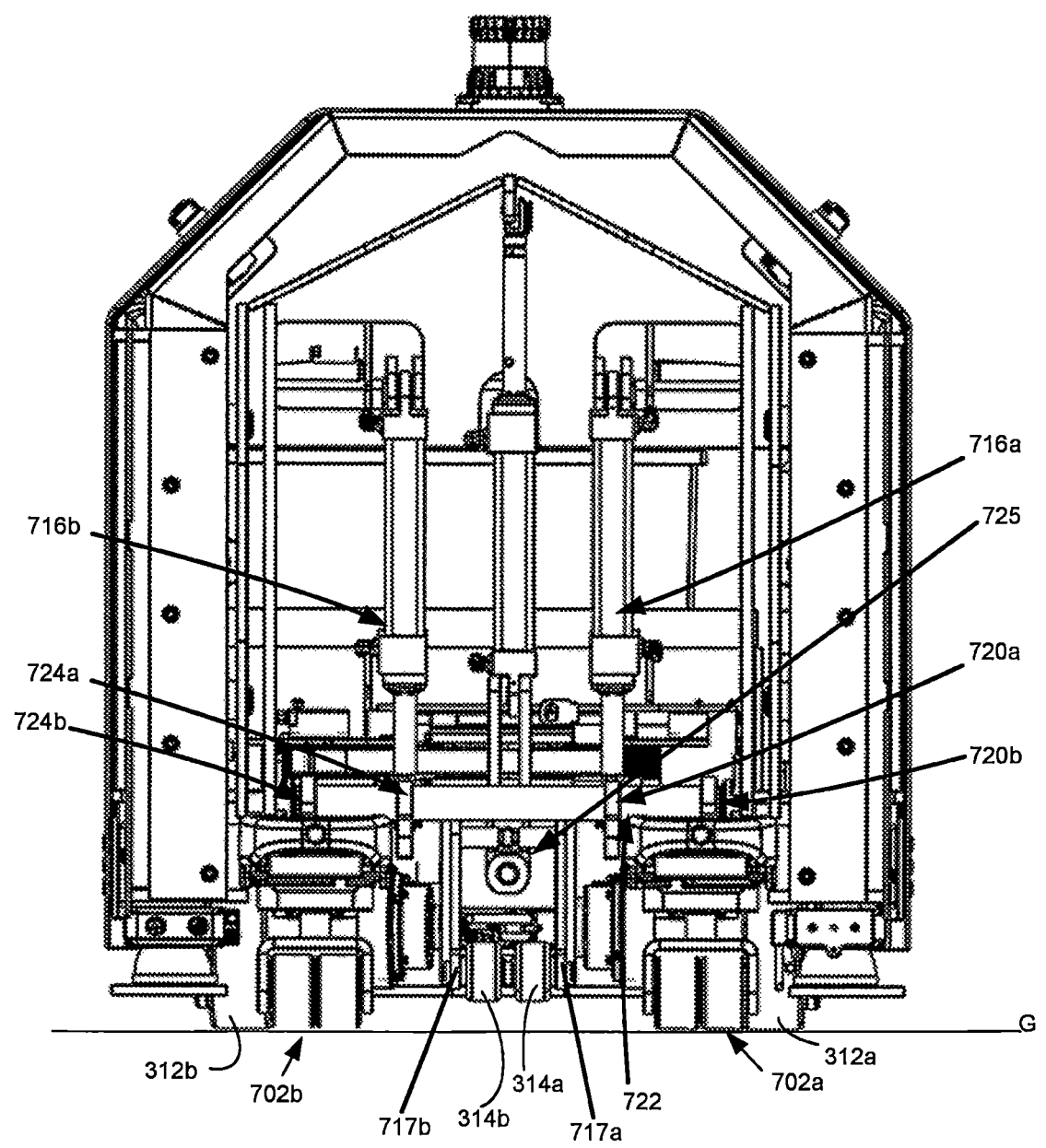
FIG. 7N illustrates a front view of wheels of an example NLS support wheel system positioned in the deployed state and in the normal travel orientation, with the example cantilevered wheels nested in the A-frame of the example pallet moving machine.

When the actuators 716*a*, 716*b* provide a vertical force in a downwards direction towards the ground G, the rods of each actuator 716*a*, 716*b* drive the ends linkages 720*a*, 724*a* coupled to the rods downwards and the opposing ends of the linkages 720*a*, 724*a* coupled to the shaft 722 upwards away from the ground G (as illustrated in FIG. 7H compared with FIG. 7N). By elevating the shaft 722 upwards, the ends of linkages 720*b*, 724*b* coupled to the shaft 722 move upwards, and the opposite ends of linkages 720*b*, 724*b* coupled to the distal ends of linkages 714*a*, 714*b* push the linkages 714*a*, 714*b* (e.g., in direction A1). In contrast, by lowering the shaft 722 via retracting the rods into actuators 716*a*, 716*b*, the opposite ends of linkages 720*b*, 724*b* coupled to the distal ends of linkages 714*a*, 714*b* retract the linkages 714*a*, 714*b* towards the A-frame 304.

FIG. 7G illustrates a side view and FIG. 7H illustrates a front view of wheels 702*a*, 702*b* of system 700 positioned on the ground G and cantilevered wheels 314*a*, 314*b* nested in the A-frame 304 of machine 300. In such configuration, the wheels 702*a*, 702*b* may be lowered enough to contact the ground G thereby allowing the machine 300 to move around without a pallet.

FIG. 7I illustrates a side view and FIG. 7J illustrates a front view of wheels 702*a*, 702*b* of system 700 positioned in a nested state and cantilevered wheels 314*a*, 314*b* deployed from the A-frame 304 of the machine 300. FIG. 7K-1 illustrates a side view taken along a first cross section NLS support wheel system positioned in a more elevated state and example cantilevered wheels 314*a*, 314*b* deployed from the A-frame 304 of the machine 300. FIG. 7K-2A illustrates another side view taken along a second cross section of the example NLS support wheel system positioned in a more elevated state and example cantilevered wheels 314*a*, 314*b* deployed from the A-frame 304 of the machine 300. FIG. 7K-2B illustrates an enlarged view of the second cross section. FIG. 7L illustrates a front view of forks 401*a*, 401*b* of system 700 positioned in an elevated state and cantilevered wheels 314*a*, 314*b* deployed from the A-frame 304 of the machine 300. In such configurations, the wheels 702*a*, 702*b* are nested within forks 401*a*, 401*b* without contacting the ground G. Further, the cantilevered wheels 314*a*, 314*b* are deployed from the A-frame 304 contacting the ground G. The configuration, illustrated in FIGS. 7I and 7J, elevates the forks 401*a*, 401*b* from the ground G, allowing entry and/or exit from a pallet having a bottom deck board (e.g., a US-style pallet), and in particular, when the pallet is on the ground G. The cantilevered wheels 314*a*, 314*b* allow the suspended forks 401*a*, 401*b* to enter and exit a pallet when the pallet is on the ground G. The configuration, illustrated in FIGS. 7K-1, 7K-2A, 7K-2B, and 7L, elevates the forks 401*a*, 401*b* from the ground G, allowing entry and/or exit from a pallet that is positioned above the ground G (e.g., such as on a conveyor or other raised platform. To retract the wheels 702*a*, 70*b* into the forks 401*a*, 401*b*, the actuators 716*a*, 716*b* may retract the respective rods within the actuators 716*a*, 716*b*.

The adjustable cantilever wheels 314*a*, 314*b* allow the forks 401*a*, 401*b* to be suspended at whatever height in the vertical travel range of the forks 401*a*, 401*b* that is preferred. Generally, for entering/exiting a US pallet, the forks 401*a*,

401*b* would be suspended above the height of the bottom deck boards and typically in the mid-point of the pallet opening. As such, the cantilever wheels 314*a*, 314*b* may be adjusted to position the height of each fork 401*a*, 401*b* to have about 2-3 mm of space above the top of the forks 401*a*, 401*b*, and about 2-3 mm above the top face of the bottom deck boards. FIGS. 7K-2A and 7K-2B illustrate the adjustable cantilever wheels 314*a*, 314*b* assembled into a cantilever wheel system in the A-frame 304 of the machine 300. The cantilever wheel system may include an actuator 725 operably coupled to pivot arms 717*a*, 717*b* and cantilever wheels 314*a*, 314*b*. The actuator 725 may be horizontally aligned with the A-frame 304 and configured to axially translate rod 715 and cross member 721 in a horizontal direction. Ends of pivot arms 717*a*, 717*b* may be rotatably coupled to the distal ends of the cross member 721. The pivot arms 717*a*, 717*b* may be rigid angled arms. Support member 723 may be coupled to and positioned at a bend in the pivot arms 717*a*, 717*b* to increase the rigidity of the cantilever wheel system. Member 723 may be fixed to one or more portions of A-frame 304, such that pivot arms 717*a*, 717*b* rotates about member 723. The cantilever wheels 314*a*, 314*b* may be rotatably coupled to ends of pivot arms 717*a*, 717*b* via a shaft 719. In one or more cases, as the actuator 725 drives the rod 715 in direction C1, the cross member 721 moves in direction C1, the pivot arms 717*a*, 717*b* rotate about member 723, and the cantilever wheels 314*a*, 314*b* rotate towards the ground G.

Figures 10A, 10B, 10C:
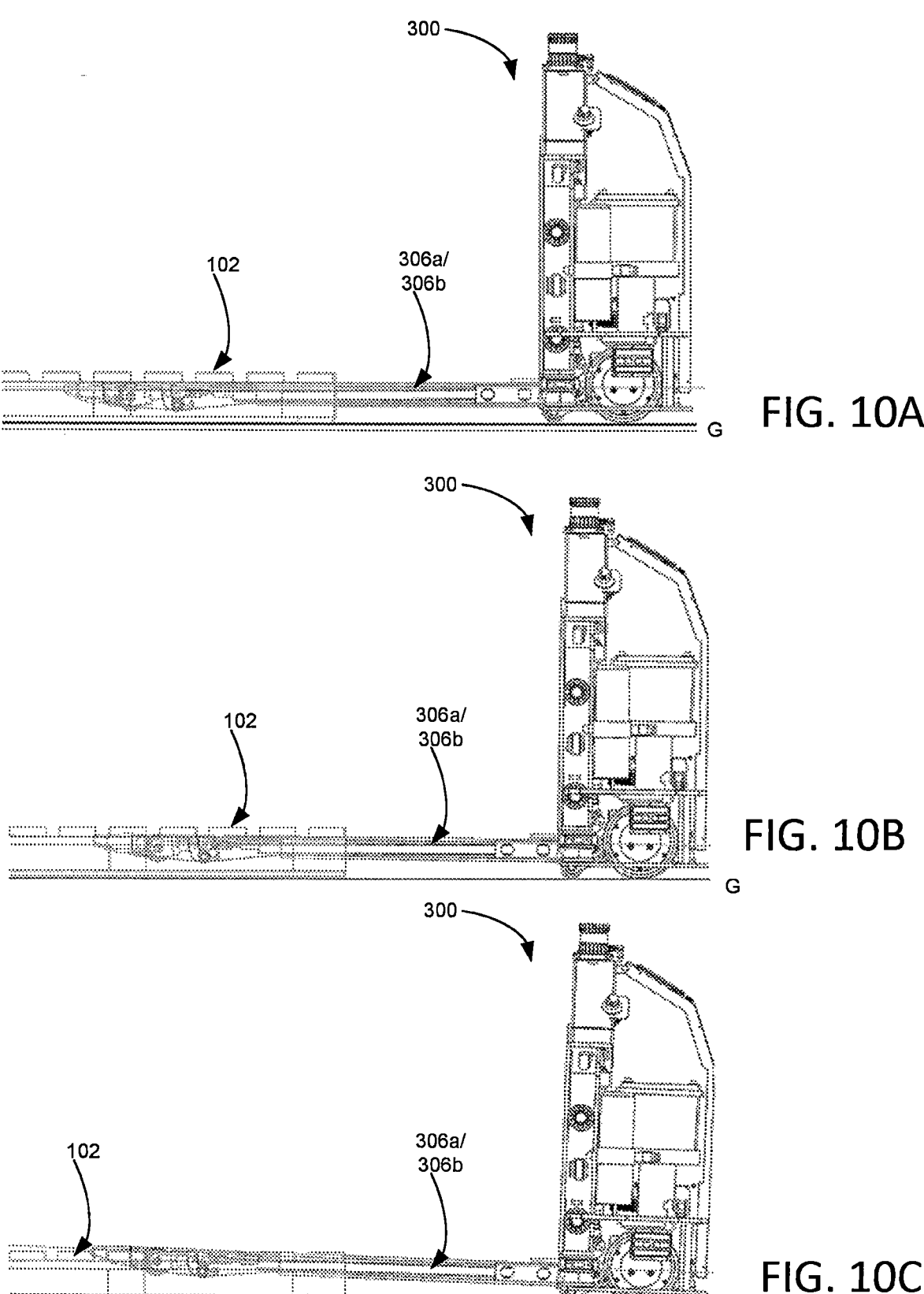
FIGS. 10A-10C illustrate an example effect of floor imperfections on the NLS support wheel system without correction by the cantilevered wheels within the A-frame of the pallet moving machine.

As the distance between the drive wheels 312*a*, 312*b* and the cantilever wheels 314*a*, 314*b* is short (e.g., about 190 mm) compared to that of the distance (e.g., about 1500 mm) from the drive wheels 312*a*, 312*b* to the distal end of the suspended forks 401*a*, 401*b*, even a very minor variation in floor height at the cantilever wheels 314*a*, 314*b* changes the angle of the forks 401*a*, 401*b*, and result in a much larger change in height of the ends of the forks 401*a*, 401*b*. Thus, the slightest variation in floor height under the drive unit of the A-frame 304 may prevent correct entering and exiting of bottom deck pallets. For instance, if the cantilever wheels 314*a*, 314*b* and the drive wheels 312*a*, 312*b* are in the same plane, the forks 401*a*, 401*b* are level, and if set at the correct height will enter/exit the pallet 102, as illustrated in FIG. 10A. However, if, for example, the drive wheels 312*a*, 312*b* are about 2 mm lower than the cantilever wheels 314*a*, 314*b*, the distal ends of the forks 401*a*, 401*b* may be about 15 mm higher and contact the top boards of the pallet 102 when entering/exiting, as illustrated in FIG. 10B. In another example, the drive wheels 312*a*, 312*b* are about 4 mm lower than the cantilever wheels 314*a*, 314*b*, the distal ends of the forks 401*a*, 401*b* may be about 32 mm higher and significantly miss the opening of the pallet 102, as illustrated in FIG. 10C. As such, the cantilever wheels 314*a*, 314*b* may be adjusted to account for the little clearance available between the forks 401*a*, 401*b* and the pallet opening.

In one or more cases, the cantilever wheels system may be utilized on an autonomous machine, as sensors at the ends of the forks 401*a*, 401*b* may detect their location relative to the opening of the pallet, or a sensor to confirm the plane of the forks 401*a*, 401*b* is horizontal, then minor adjustments may be made to the actuator 715 that moves the pivot arms 717*a*, 717*b* to lower or raise the cantilever wheels 314*a*, 314*b* by small increments in the direction required. With a computer control system, such fine adjustments can be made in milliseconds and the ends of the forks 401*a*, 401*b* can remain in the center of the pallet opening as the machine 300 enters or exits a pallet.

FIG. 7M-1 illustrates a side view taken along a first cross section of an example NLS support wheel system positioned in the deployed state and in the normal travel orientation, with the example cantilevered wheels 314a, 314b nested in the A-frame 304 of the machine 300. FIG. 7M-2A illustrates another side view taken along a second cross section of the example NLS support wheel system positioned in the deployed state and in the normal travel orientation, with the cantilevered wheels 314a, 314b nested in the A-frame 304 of the machine 300. FIG. 7M-2B illustrates an enlarged view of the second cross section. FIG. 7N illustrates a front view of wheels 702a, 702b of system 700 positioned in the deployed state and cantilevered wheels 314a, 314b nested in the A-frame 304 of the machine 300. In this configuration, the A-frame 304 and forks 401a, 401b are raised, the cantilevered wheels 314a, 314b are retracted within the A-frame 304, and the wheels 702a, 702b are configured in a deployed state in contact with the ground G. In one or more cases, as the actuator 725 drives the rod 715 in direction C2, the cross member 721 moves in direction C2, the pivot arms 717a, 717b rotate about member 723, and the cantilever wheels 314a, 314b rotate away from the ground G.

Figure 7O:
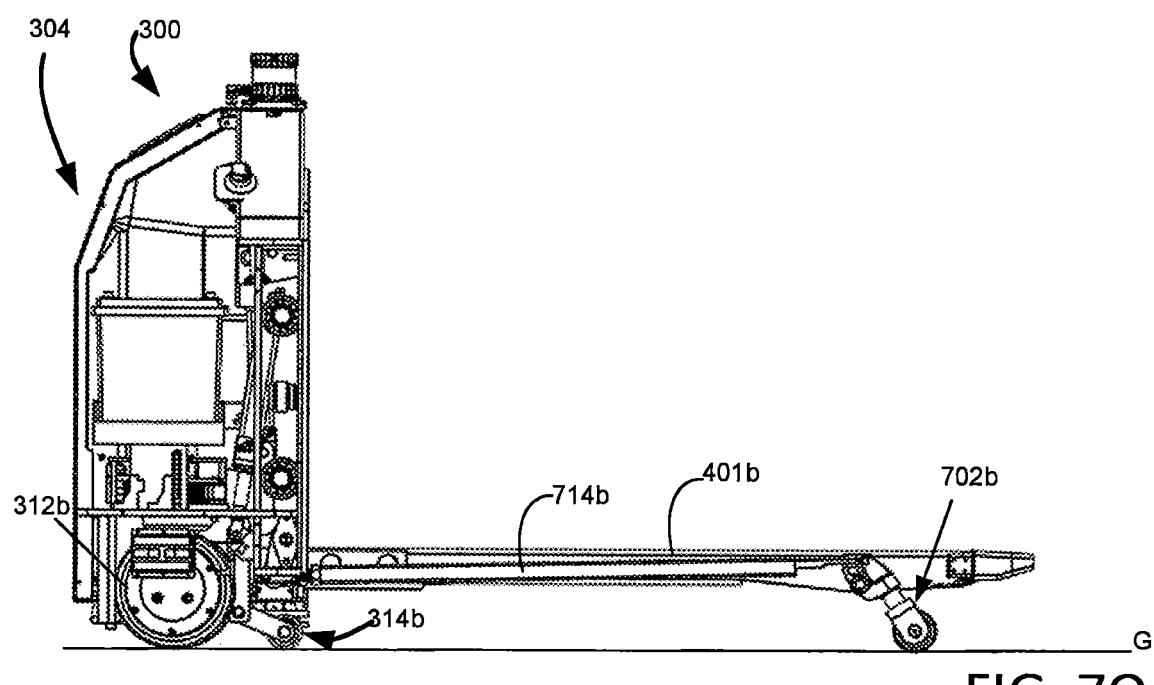
FIG. 7O illustrates a side view and FIG. 7P illustrates a front view of wheels of an example NLS support wheel system and example cantilevered wheels positioned in lowering state.
Figure 7P:
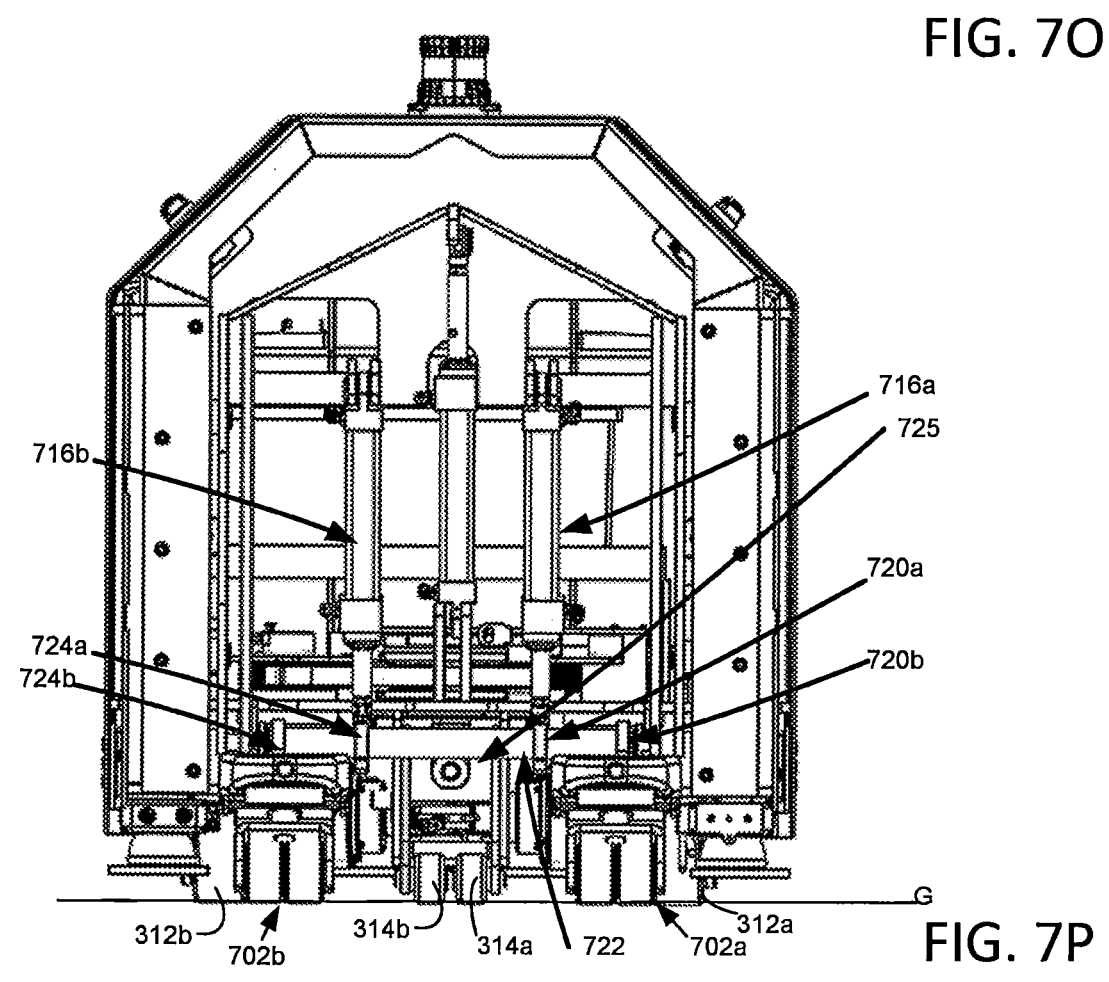
Figure 7Q:
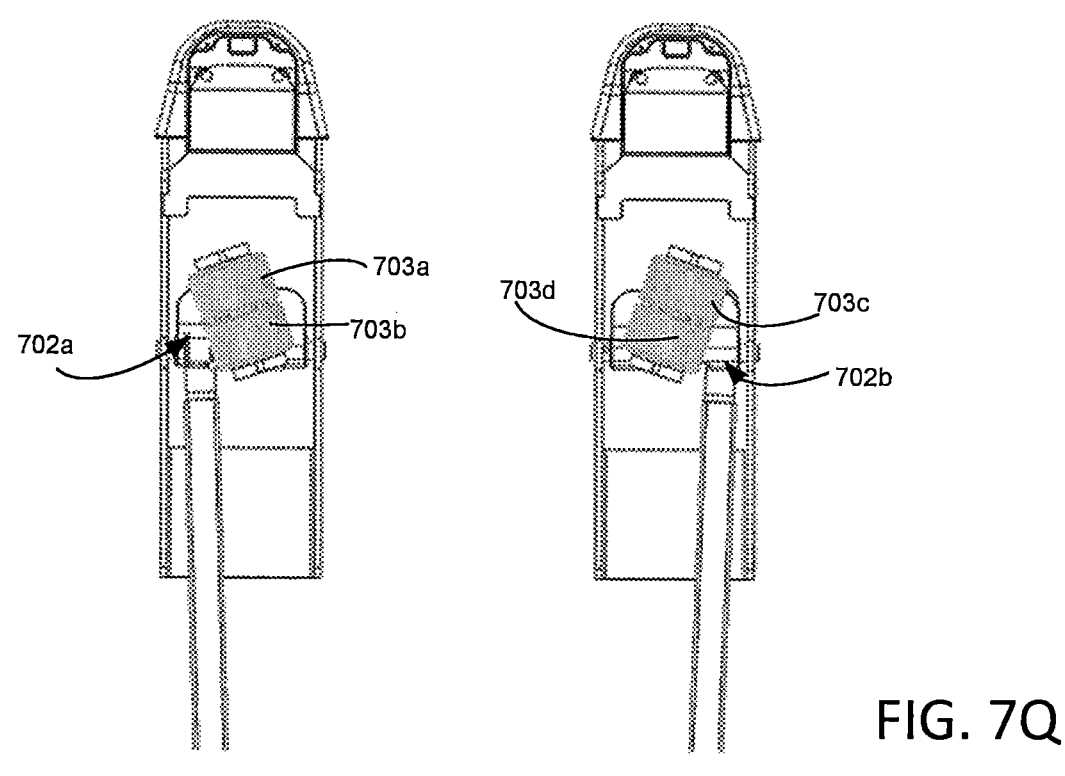
FIGS. 7Q-7S illustrate various orientations of the wheels of an example NLS support wheel system.
Figure 7R:
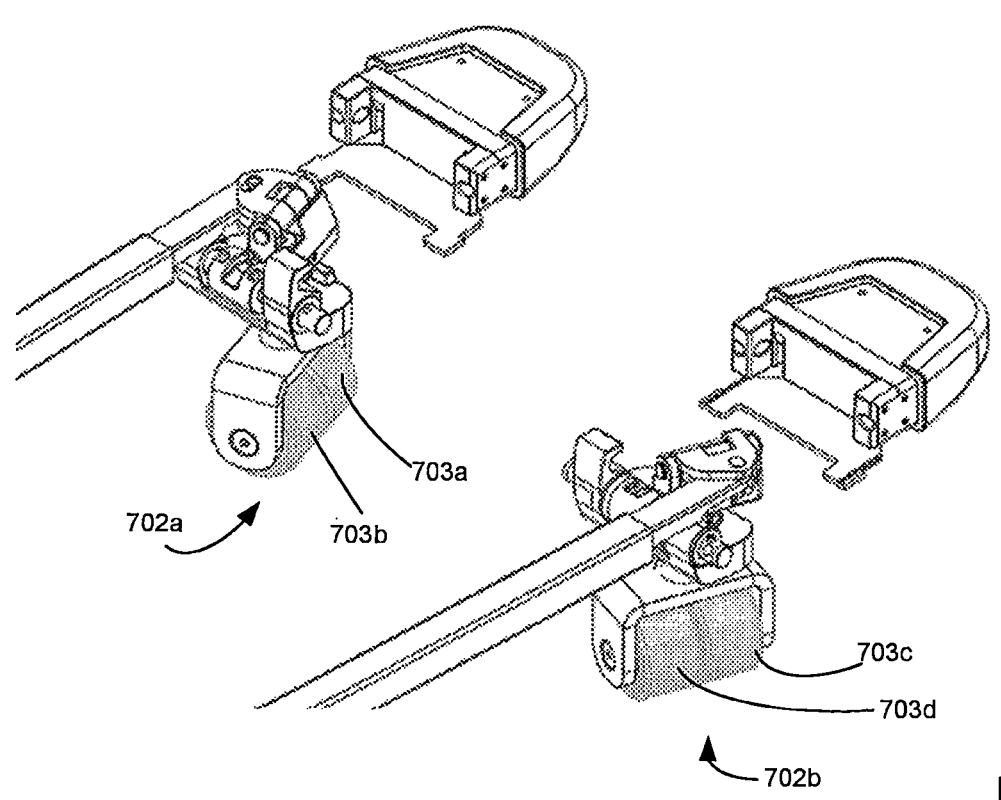
Figure 7S:
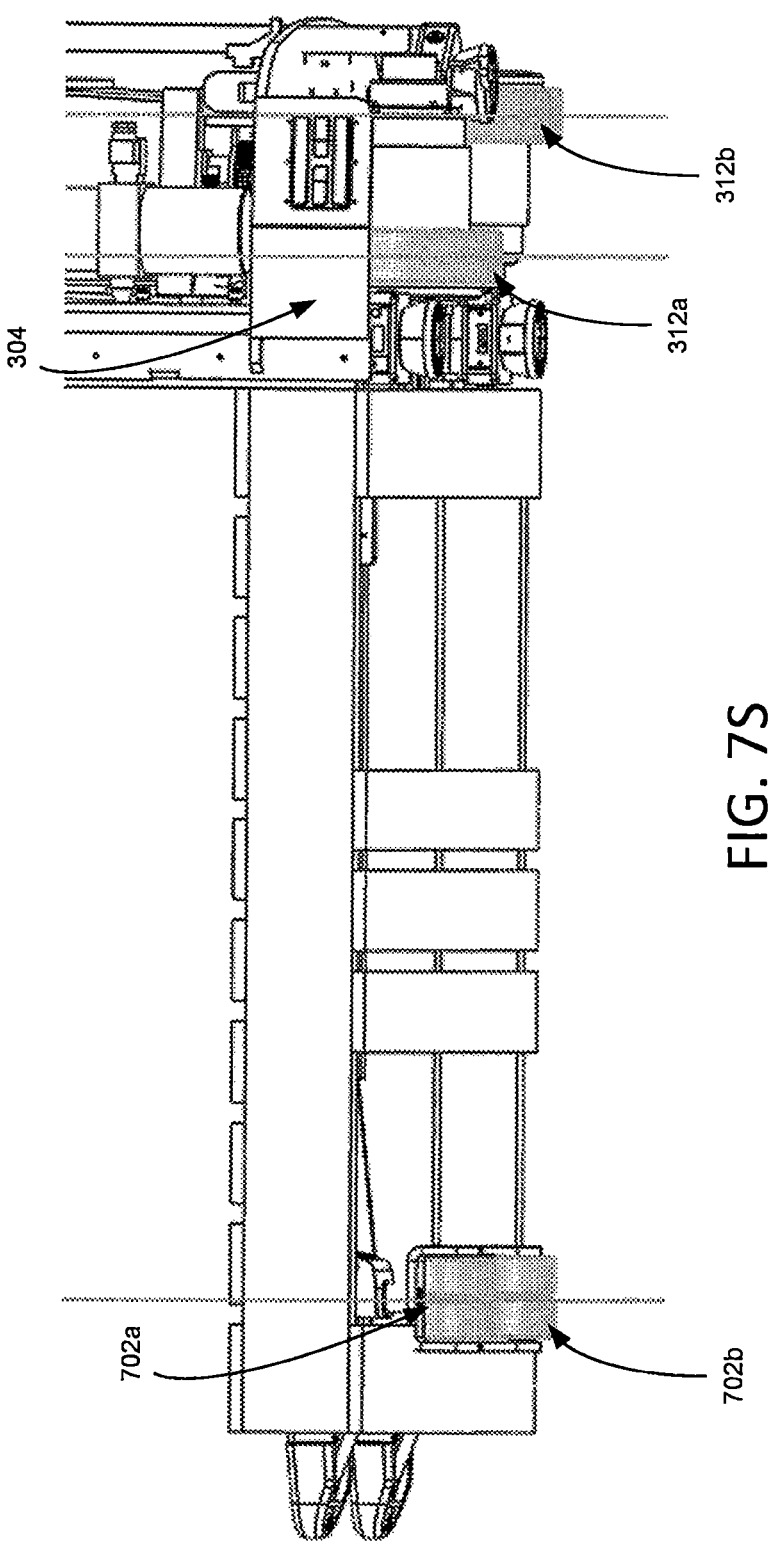
Figure 8A:
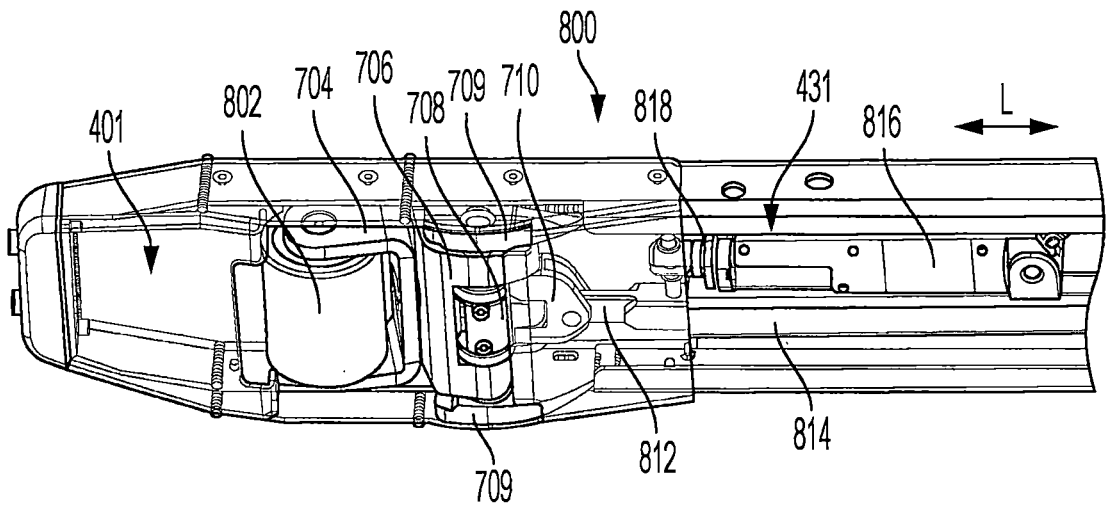
FIGS. 8A-8D illustrate another example fork and example NLS support wheel system transitioning between a nested state and various orientations of deployed states.
Figure 8B:
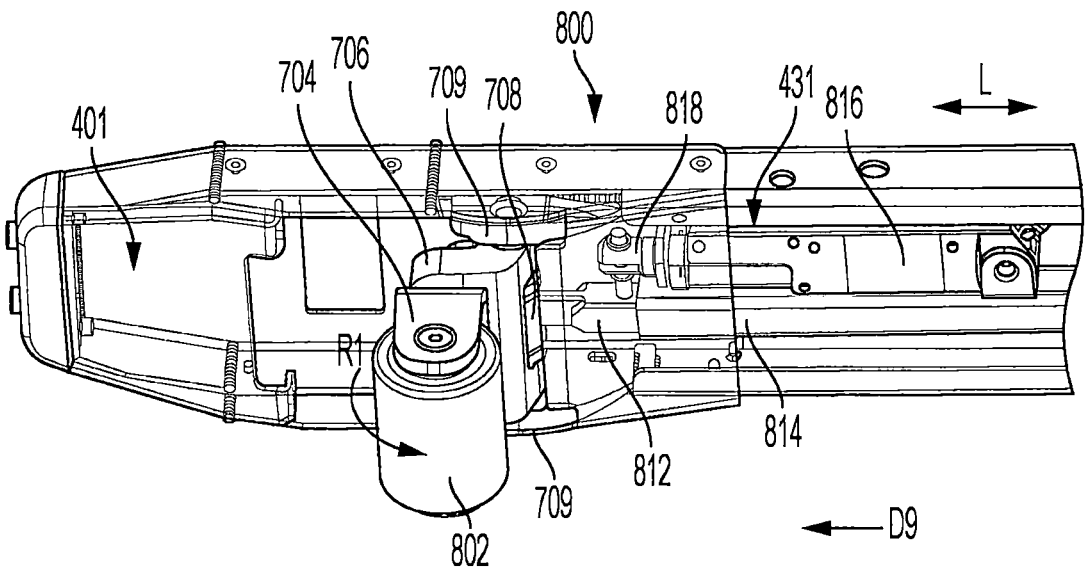
Figure 8C:
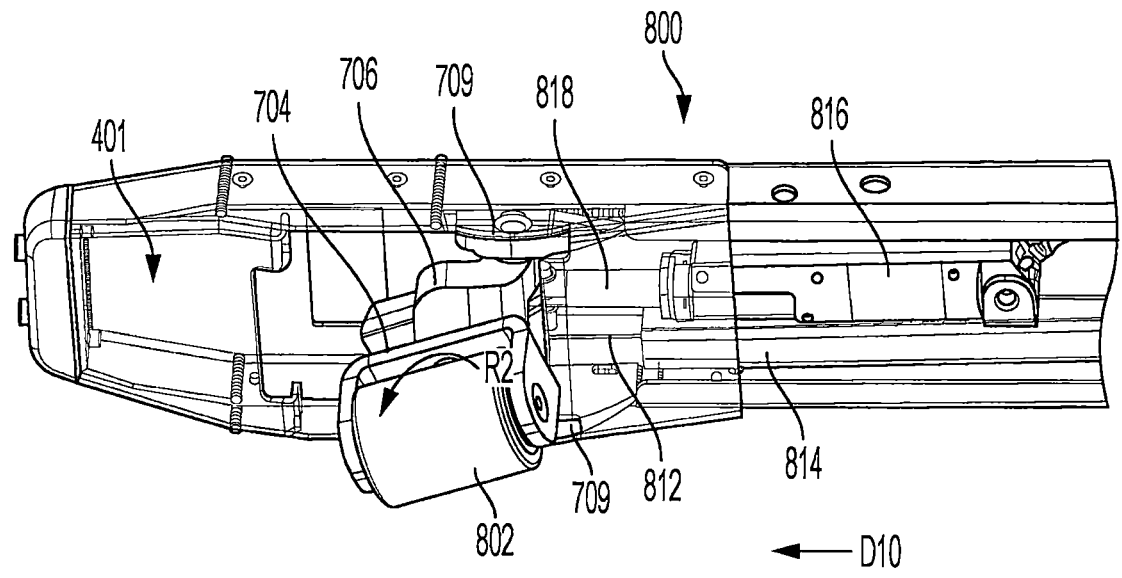
Figure 8D:
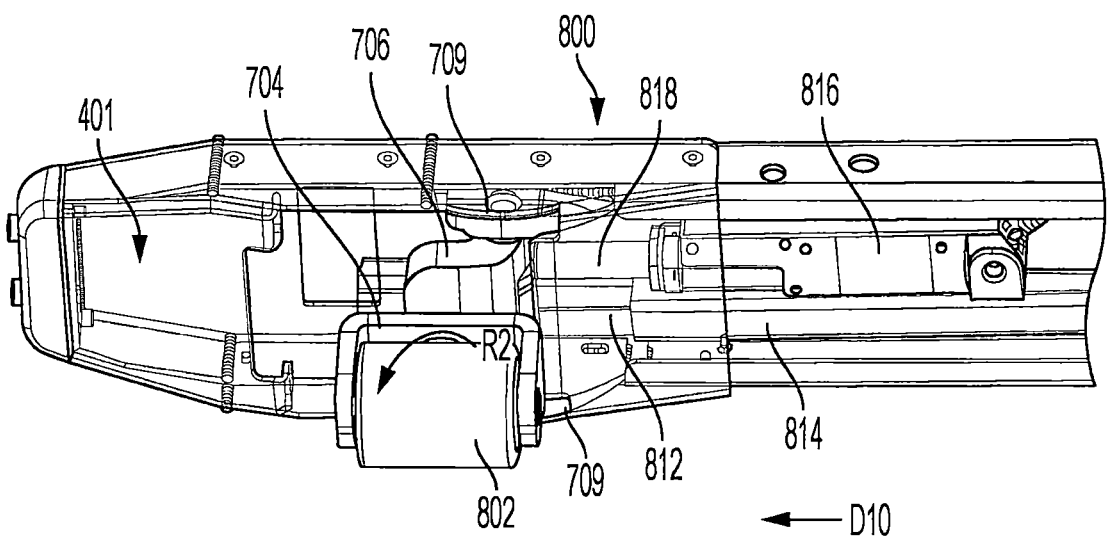

FIG. 7O illustrates a side view and FIG. 7P illustrates a front view of wheels 702a, 702b of system 700 and cantilevered wheels 314a, 314b positioned in lowering state. In such configuration, the A-frame 304 and forks 401a, 401b may be lowered and the cantilevered wheels 314a, 314b adjusted in height so as to ensure that the forks 401a, 401b are parallel with the ground, G. This configuration allows a pallet to be lowered onto an open conveyor, and then the wheels 702a, 702b are transitioned into the nested state as the forks 401a, 401b exit the pallet.

FIGS. 8A-8D illustrate another example NLS support wheel system 800 (hereinafter "system 800") transitioning between a nested state and a deployed state. It is noted that system 800 may be utilized by machine 300 in the same or similar manner as systems 308a, 308b. One or more portions of system 800 may be configured to translate within the cavity 431 to transition the system 800 between nested and deployed states. Further, system 800 includes one or more of the same or similar components as that of system 700. As such, a description of those features is not repeated. System 800 is distinguishable from system 700 in that system 800 includes an actuator 816 operably coupled to linkage 814.

In one or more cases, the wheel 802 may be a singular wheel having a diameter of about 75 mm. In one or more other cases, the wheel 802 may be a dual-wheel similar to that of wheels 702a, 702b of system 700.

The wheel 802 is operably coupled with a linkage member 814 via rotatable member 706, pivot member 708, steering member 710, and wheel mount 704. The linkage 814 may be pushed and/or retracted via an actuator vertically positioned within an A-frame in a same or similar manner as the actuator 415b within the A-frame 427 or actuator 716c within the A-frame 304. The vertically positioned actuator may be configured to transition the system 800 from a nested state to a deployed state by driving the linkage 814 in direction D9. As the linkage 814 moves in direction D9, the shaft 812 moves the steering member 710 in direction D9 causing the rotatable member 706 and pivot member 708 to rotate about mounts 709 and steering member 710 in direction R1, thereby transitioning the wheel 802 from the nested state to the deployed state. During this initial transition, the wheel 802 is oriented in a straight direction of travel.

One end of actuator 816 may be fixed to a portion of the linkage 814. A rod 818 of the actuator 816 may be coupled to the shaft 812. To further orient the wheel 802, the actuator 816 may translate the rod 818 in direction D10, thereby translating the shaft 812 in direction D10. As the shaft 812 moves in direction D10, the end of the shaft 812 pivots about the steering member 710, thereby pivoting the wheel 802 in direction R2.

FIGS. 9A-9D illustrate machine 300 moving a pallet 102 via forks 306a, 306b and NLS support wheel systems 900 (hereinafter "system 900"). It is noted that each fork 306a, 306b may include system 900. Further, for convenience in describing FIGS. 9A-9D, system 900 refers to any of systems 400, 500, 600, 700, and 800. As such, in one or more cases, both forks 306a, 306b may include the same system. For example, forks 306a, 306b may both utilize system 400 or system 700. In one or more other cases, forks 306a, 306b may utilize different systems. For example, fork 306a may utilize system 500, and fork 306b may utilize system 600. The system 900 provides a pivotable (e.g., steerable) assembly that is itself pivotable in the perpendicular axis in a lifting assembly. In one or more cases, the system 900 includes an actuator (e.g., a hydraulic cylinder actuator) to actuate a pivot to push the wheel into a vertical orientation. The system 900 includes another actuator configured to rotate the wheel into a particular orientation.

Figure 9A:
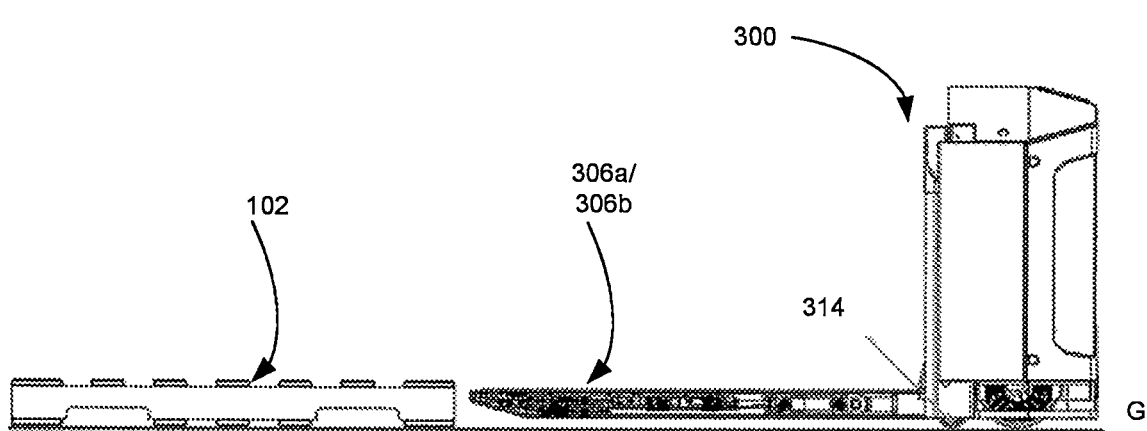
FIGS. 9A-9D illustrate an example pallet moving machine entering, lifting and then moving a bottom deck pallet via example forks and NLS support wheel systems.
Figure 9B:
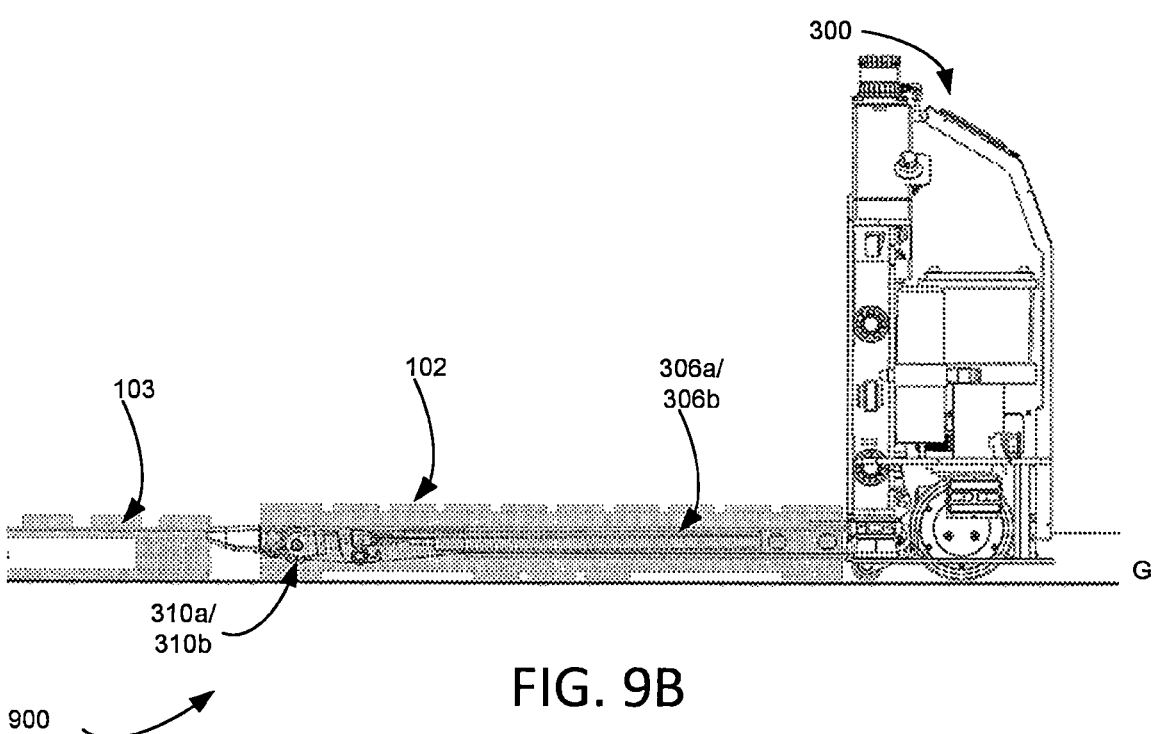

As illustrated in FIG. 9A the machine 300 travels towards the pallet 102. In some cases, the machine 300 lowers the forks 306a, 306b towards the ground G. For example, the machine 300 may lower the forks 306a, 306b to about 15 mm above the height of the ground G, such that the forks 306a, 306b are suspended but parallel to the ground G. The cantilevered wheels 314 are configured to support the forks 306a, 306b in the cantilevered position. While the forks 306a, 306b are in a cantilevered position, the forks 306a, 306b enter the respective cavities of the pallet 102, as illustrated in FIG. 9B. In one or more cases, a pallet 103 may have a different opening height than pallet 102, preventing the forks 306a, 306b from entering the opening of pallet 103. In such cases, the cantilever wheels 314a, 314b may be adjusted to raise or lower the height of the forks 306a, 306b to enter the opening of pallet 103. As the forks 306a, 306b are suspended, the wheels 310a, 310b of the machine 300 may travel into the cavities of the pallet 102 without contacting the bottom deck boards of the pallet 102 while traveling over the bottom deck board. Further, the forks 306a, 306b may be suspended in about the center of each cavity, for example, about 15 mm above the height of the ground G. As the machine 300 moves forward and the forks 306a, 306b travel into the pallet, the forks 306a, 306b are able to self-adjust, being gently deflected up or down by the interference of the deck boards of the pallet 102 above the forks 306a, 306b, or the deck boards of the pallet 102 below the forks 306a, 306b.

Figure 9C:
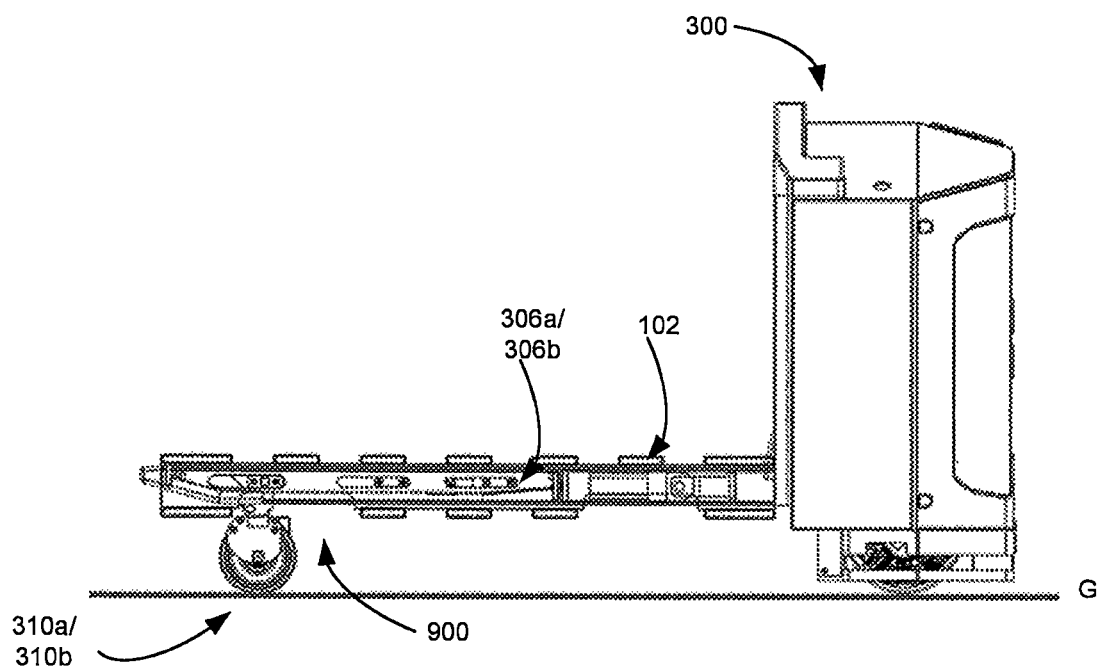

In some cases, once the forks 306a, 306b are positioned within the pallet 102, the forks 306a, 306b may raise the pallet 102 (and any load placed on the pallet 102) upwards to a height that allows the systems 900 disposed within each fork 306a, 306b to transition the wheels 310a, 310b from a nested state to a deployed state. Thereafter, the forks 306a, 306b may be lowered until the wheels 310a, 310b contact the ground G. In other cases, once the forks 306a, 306b are positioned within the pallet 102, the forks 306a, 306b may rise upwards at the same time as the wheels 310a, 310b transition from a nested state to a deployed state. In yet other cases, once the forks 306a, 306b are positioned within the pallet 102, the system 900 disposed within each of the forks 306a, 306b transitions the wheels 310a, 310b from a nested state to a deployed state, as illustrated in FIG. 9C, thereby raising the height of the forks 306a, 306b. In one or more cases, the cantilevered wheels 314 may retract into the A-frame and/or be elevated from the ground G, thereby allowing the wheels 310a, 310b, 312a, 312b to travel in a variety of directions (e.g., a horizontal direction). While in the deployed state, the systems 900 may orient the respective wheels 310a, 310b to various angles according to the function to be performed (e.g., traveling in a straight direction or a lateral direction, traveling to rotate about a center of the machine 300, or traveling in any direction by dynamically orienting the wheels to provide more stable and tighter turning and translational movement when traveling).

Figure 9D:
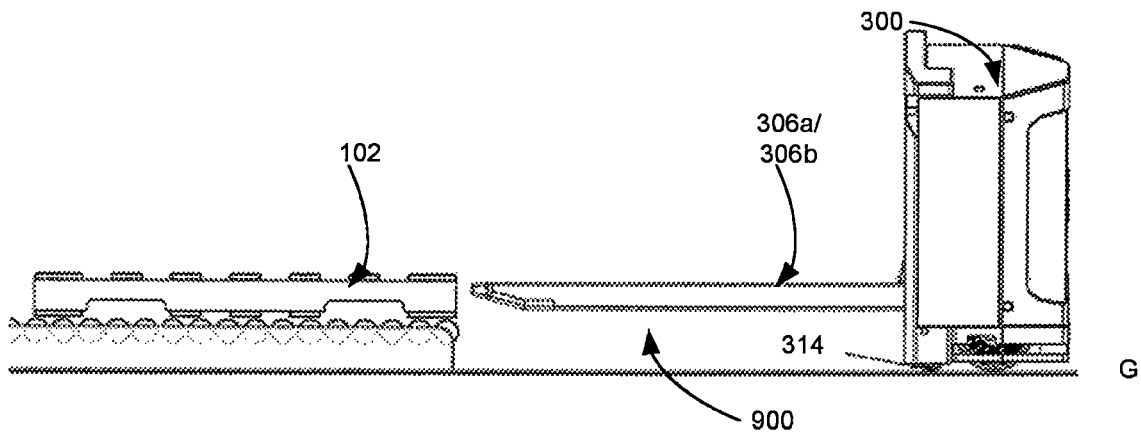

In one or more cases, the machine 300 may be configured to load a pallet 102 onto the forks 306a, 306b where the pallet is positioned in an elevated position (e.g., on a conveyor) from the ground G, as illustrated in FIG. 9D. In such cases, the forks 306a, 306b may be raised to a height corresponding to the height of the cavities of the pallet 102, the wheels 310a, 310b are configured in a nested state, and the cantilevered wheels 314 are deployed from the A-frame of the machine 300 to contact the ground G. In some cases, the vertical position of the wheels 314 may be adjustable based on feedback provided by sensors (e.g., sonar sensors) position on the ends of the forks 306a, 306b. The wheels 314 may be adjusted to ensure correct alignment with the height of the pallet 102 from the ground G. In one or more other cases, sensors may be provided on the forks 306a, 306b to provide feedback that indicates a horizontal alignment of the forks 306a, 306b. In such cases, the machine 300 may adjust the vertical position of the wheels 314 to maintain the forks 306a, 306b being parallel with the ground G.

In one or more cases, the systems 900 provided in forks 306a, 306b improve loading and unloading pallets, such as pallets having bottom deck boards. In one or more cases, the systems 900 provides increased directions of travel (e.g., lateral travel, rotation about center, and the like) when utilized with the drive assembly 302. Further, the systems 900 improves travel for the machine 300 when traveling over uneven terrain, such as dock plates or dock levelers. In some cases, the systems 900 provided in each fork 306a, 306b may independently rotate each respective wheels 310a, 310b left and right allowing the machine 300 to travel straight, laterally, or in another direction in a more compact manner. In one or more cases, the systems 900 may be utilized in a double-wide pallet moving machine. For example, the double-wide pallet moving machine may have four forks to carry two pallets. In such cases, the systems 900 may be provided in each of the four forks. In some cases, as pallets may require different spacing in between the forks, rotary screws may be used to move the forks laterally to position the forks within the cavities of the pallet. Drive wheels may be 2×0.75 KW drive wheels. In one or more cases, the machine 300 may not include pallet detection flaps, but rather use sensors positioned at the end of the forks 306a, 306b to measure side walls of a pallet and/or confirm detection of a pallet. For instance, the forks 306a, 306b may enter the cavities of the pallet until the sensors detect that the tips of the forks extend out the opposite end of the pallet. In such cases, the sensors may provide feedback to the machine 300, such that the machine 300 loads the pallet near the end of the forks 306a, 306b and not against the A-frame. Further, sensors may also be placed on either side of the A-frame of the machine 300 to check distance to sidewalls (e.g., truck walls). Thus, with the combination of sensors, the machine 300 may determine the distance to sidewalls and the distance to the next row of pallets to orient and align the forks within the pallet.

The various embodiments described above are provided by way of illustration only and should not be construed to limit the claims attached hereto. Those skilled in the art will readily recognize various modifications and changes that may be made without following the example embodiments and applications illustrated and described herein, and without departing from the spirit and scope of the following claims.

What is claimed is:

1. A material handling device, comprising:
a driven end and a lifting end;
a pair of housings disposed on the lifting end that are connected to and extend from the driven end;
a first linkage and a second linkage that extend from the lifting end and are configured to respectively translate along a longitudinal axis of each respective housing; and
at least one actuator configured to drive the first linkage and the second linkage, wherein a first end of the at least one actuator is coupled to a portion of the driven end, and a second end of the at least one actuator is operably coupled to the first linkage and the second linkage, wherein the at least one actuator is configured to translate the first linkage and the second linkage along the longitudinal axis of each respective housing, wherein each housing comprises a rotational assembly mounted therein and coupled to a respective one of the first linkage or the second linkage, the rotational assembly comprising at least one wheel pivotably coupled to a bracket supported by the rotational assembly wherein the first linkage is driven a first distance along the longitudinal axis to rotate the respective rotational assembly in a first axis of rotation such that the bracket and the at least one wheel rotate from a first position within the housing to a second position outside of the housing, and wherein the first linkage is driven a second distance along the longitudinal axis to rotate the respective rotational assembly in a second axis of rotation such that the bracket and the at least one wheel rotate from the second position to a third position in which a heading of the at least one wheel is oriented.

2. The material handling device of claim 1, wherein, in the first position, the bracket and the at least one wheel of the rotational assembly are arranged within the housing at a first angle with respect to the housing, and wherein, in the second position, the bracket and the at least one wheel of the rotational assembly is configured to rotate through the opening of the housing to a second angle with respect to the housing.

3. The material handling device of claim 2, wherein, in the third position, a steering member coupled to a respective one of the first linkage or the second linkage is configured to rotate about a distal end of the respective first linkage or second linkage, such that the at least one wheel pivots about the bracket of the rotational assembly based on the rotation of the steering member.

4. The material handling device of claim 2, wherein, in the third position, a steering member is translated towards the proximal end of the housing, wherein a pivoting member rotates about the distal end of the steering member, such that the at least one wheel pivots about the bracket of the rotational assembly based on the rotation of the pivoting member.

5. The material handling device of claim 1, further comprising:

at least one cantilever wheel configured to adjust an angle of the driven end and an angle of the lifting end of the material handling device.

6. The material handling device of claim 5, wherein the at least one cantilever wheel comprises a mount positioned within the driven end, the mount having a first end coupled to the at least one cantilever wheel and a second end coupled to another actuator via a third linkage, wherein the other actuator is configured to extend the third linkage, such that the mount rotates the at least one cantilever wheel from a first state to a second state, such that the driven end is positioned at a first angle, and wherein the other actuator is configured to retract the third linkage, such that the mount rotates the at least one cantilever wheel from the second state to the first state, such that the driven end is positioned at a second angle.

7. The material handling device of claim 6, further comprising at least one sensor coupled to the driven end and configured to detect an angle of one or both of the pair of housings or to determine a distance between the pair of housings and an object, wherein the third actuator is configured to extend or retract the third linkage based on the detected angle or determined distance.

8. The material handling device of claim 6, wherein when the at least one cantilever wheel transitions to the second state, the pair of housings are positioned in a first position.

9. The material handling device of claim 6, wherein when the at least one cantilever wheel transitions to the first state, the pair of housings are positioned in a second position.

10. The material handling device of claim 1, wherein the rotational assembly is configured to transition the at least one wheel from the first position through an opening disposed on a bottom of the housing.

11. The material handling device of claim 1, wherein the at least one wheel is pivotably coupled to the bracket via a wheel mount and a pivoting member, and wherein the wheel mount and pivoting member are disposed on opposing sides of the bracket.

12. A material handling device, comprising:

a driven end and a lifting end;

a pair of housings disposed on the lifting end that are connected to and extending from the driven end;

a first linkage and a second linkage that extend from the lifting end and are configured to respectively translate along a longitudinal axis of each respective housing;

at least one actuator configured to drive the first linkage and the second linkage, wherein a first end of the at least one actuator is coupled to a portion of the driven end, and a second end of the at least one actuator is operably coupled to the first and second linkage, wherein the at least one actuator is configured to translate the first linkage and the second linkage along the longitudinal axis of each respective housing; and at least one cantilever wheel configured to adjust an angle of the driven end and the lifting end of the material handling device, the at least one cantilever wheel comprising a mount positioned within the driven end, the mount having a first end coupled to the at least one cantilever wheel and a second end coupled to another actuator via a third linkage, wherein the other actuator is configured to extend the third linkage towards the lifting end, such that the mount rotates the at least one cantilever wheel from a first state to a second state, such that the driven end is positioned at a first angle, and wherein the other actuator is configured to retract the third linkage away from the lifting end, such that the mount rotates the at least one cantilever wheel from the second state to the first state, such that the driven end is positioned at a second angle.

13. The material handling device of claim 12, further comprising at least one sensor coupled to the driven end and configured to detect an angle of one or both of the pair of housings or to determine a distance between the pair of housings and an object, wherein the other actuator is configured to extend or retract the third linkage based on the detected angle or determined distance.

14. The material handling device of claim 12, wherein when the at least one cantilever wheel transitions to the second state, the pair of housings are positioned in a first position, and wherein when the at least one cantilever wheel transitions to the first state, the pair of housings are positioned in a second position.

15. The material handling device of claim 12, wherein:

each housing comprises a rotational assembly mounted therein and coupled to a respective one of the first linkage or the second linkage, the rotational assembly comprising at least one wheel pivotably coupled to a bracket supported by the rotational assembly, wherein the first linkage is driven a first distance along the longitudinal axis to rotate the respective rotational assembly in a first axis of rotation such that the bracket and the at least one wheel rotate from a first position within the housing to a second position outside of the housing, and wherein the first linkage is driven a second distance along the longitudinal axis to rotate the respective rotational assembly in a second axis of rotation such that the bracket and the at least one wheel rotate from the second position to a third position in which a heading of the at least one wheel is oriented.

16. A material handling device:

a driven end and a lifting end;

a pair of housings disposed on the lifting end that are connected to and extending from the driven end;

a first linkage and a second linkage respectively disposed in each of the housings; and at least one actuator configured to drive the first linkage and the second linkage along a longitudinal axis of each respective housing, wherein a first end of the at least one actuator is coupled to a portion of the driven end, wherein a second end of the at least one actuator is coupled to the first linkage and the second linkage, wherein each housing comprises a rotational assembly mounted therein and coupled to a respective one of the first linkage and the second linkage, and wherein the rotational assembly is configured to transition at least one wheel from a first position being located within the housing to a second position being located outside of the housing to a third position in which a heading of the at least one wheel is oriented.

17. The material handling device of claim 16, wherein the at least one wheel configured to pivot about an axis of the rotational assembly to orient the heading of the at least one wheel.

18. The material handling device of claim 16, wherein the at least one wheel is configured to pivot about an axis of the rotational assembly from the first position to the second position to transition the wheel through an opening disposed on the bottom of the respective housing.

19. The material handling device of claim 16, wherein the at least one actuator configured to drive the first linkage and the second linkage a first distance towards a proximal end of the lifting end to transition the respective at least one wheel from the first position to the second position.

20. The material handling device of claim 19, wherein the at least one actuator configured to drive the first linkage and the second linkage a second distance towards the proximal end of the lifting end to transition the respective at least one wheel from the second position to the third position.

\* \* \* \* \*